(12) United States Patent
Kitamura et al.

(10) Patent No.: US 12,122,116 B2
(45) Date of Patent: Oct. 22, 2024

(54) POWDERY MATERIAL PROCESSING SYSTEM AND METHOD OF CONTROLLING THE SAME

(71) Applicant: KIKUSUI SEISAKUSHO LTD., Kyoto (JP)

(72) Inventors: Naoshige Kitamura, Kyoto (JP); Shinsuke Fushimi, Kyoto (JP); Hideyuki Nishimura, Kyoto (JP); Yuuya Kawai, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 465 days.

(21) Appl. No.: 16/810,488

(22) Filed: Mar. 5, 2020

(65) Prior Publication Data
US 2020/0307139 A1 Oct. 1, 2020

(30) Foreign Application Priority Data
Apr. 1, 2019 (JP) .................. 2019-069620

(51) Int. Cl.
*B29C 43/08* (2006.01)
*B30B 11/02* (2006.01)
*B30B 15/30* (2006.01)

(52) U.S. Cl.
CPC ............ *B30B 15/302* (2013.01); *B30B 11/02* (2013.01); *B29C 43/08* (2013.01)

(58) Field of Classification Search
CPC ....... B30B 15/302; B30B 11/08; B29C 43/58; B29C 43/34; B29C 43/02; B29C 43/08
See application file for complete search history.

(56) References Cited

U.S. PATENT DOCUMENTS

| | | |
|---|---|---|
| 3,804,303 A | 4/1974 | Fassauer |
| 4,756,348 A | 7/1988 | Moller |
| | (Continued) | |

FOREIGN PATENT DOCUMENTS

| | | | |
|---|---|---|---|
| BE | | 458288 A | 9/1945 |
| DE | 20 2015 107 010 U1 | | 1/2016 |
| | (Continued) | | |

OTHER PUBLICATIONS

Hildebrandt Claudia et al.: "Simulation of particle size segregation in a pharmaceutical tablet press lab-scale gravity feeder", Advanced Powder Technology, Elsevier BV, NL, vol. 29, No. 3, Dec. 30, 2017 (Dec. 30, 2017), pp. 765-780, XP085368434, ISSN: 0921-8831, DOI: 10.1016/J.APT.2017.12.01.
United States Office Action dated Oct. 5, 2021 in U.S. Appl. No. 16/513,521.
(Continued)

*Primary Examiner* — Thu Khanh T. Nguyen
(74) *Attorney, Agent, or Firm* — MCGINN I.P. LAW GROUP, PLLC

(57) ABSTRACT

A processing system includes a powdery-material feeding device including at least one feeder configured to discharge a reserved powdery material, and an equipment including a filling device configured to be fed with the powdery material discharged from the feeder and configured to execute a post process using the powdery material filled by the filling device, in which upon a start of the equipment having stopped filling with the powdery material by the filling device and executing the post process, when the feeder supplies the filling device with the predetermined amount of the powdery material before the start of the equipment being stopped, the processing system executes tuning of measuring a relation between control input provided to a motor of the feeder and a flow rate of the powdery material discharged from the feeder.

18 Claims, 23 Drawing Sheets

(56) References Cited

U.S. PATENT DOCUMENTS

| | | | |
|---|---|---|---|
| 6,068,465 A | 5/2000 | Wilson | |
| 6,168,305 B1* | 1/2001 | Marmsater | G01G 11/086 |
| | | | 700/240 |
| 2004/0192882 A1* | 9/2004 | Vidaurri | C08L 81/02 |
| | | | 528/503 |
| 2012/0061869 A1* | 3/2012 | Boeckx | B29C 43/34 |
| | | | 425/110 |
| 2016/0243781 A1 | 8/2016 | Vandenbroucke et al. | |
| 2016/0361885 A1 | 12/2016 | Oyama et al. | |
| 2017/0281552 A1 | 10/2017 | Oyama et al. | |
| 2017/0282420 A1 | 10/2017 | Kitamura et al. | |
| 2018/0141275 A1 | 5/2018 | Patel et al. | |
| 2018/0264490 A1 | 9/2018 | Fushimi et al. | |
| 2018/0271791 A1 | 9/2018 | Myerson et al. | |
| 2020/0070388 A1 | 3/2020 | Kitamura et al. | |

FOREIGN PATENT DOCUMENTS

| | | |
|---|---|---|
| JP | H06-136403 A | 5/1994 |
| JP | H09-271996 A | 10/1997 |
| JP | 2007-038272 A | 2/2007 |
| JP | 2007-210022 A | 8/2007 |
| JP | 4725722 B2 | 7/2011 |
| JP | 2016-048218 A | 4/2016 |
| JP | 2017-001081 A | 1/2017 |
| JP | 2017-177137 A | 10/2017 |
| JP | 2018-154431 A | 10/2018 |

OTHER PUBLICATIONS

United States Office Action dated Dec. 7, 2021 in U.S. Appl. No. 16/513,521.

* cited by examiner

POWDERY MATERIAL PROCESSING SYSTEM AND METHOD OF CONTROLLING THE SAME

BACKGROUND

There has been known a rotary compression-molding machine including a table of a turret having die bores, and an upper punch and a lower punch slidably retained above and below each of the die bores, and configured to horizontally rotate the die bores and the punches together to compression mold or tablet a powdery material filled in the die bores when the paired upper and lower punches pass between an upper roll and a lower roll. The molding machine of this type is adopted to obtain molded products such as pharmaceutical tablets, food products, and electronic components.

To date, a pharmaceutical tablet or the like has typically been produced through a procedure according to a batch method including forming, from a powdery material as a constituent material, an intermediate product in each of processes such as granulating, drying, grading, and mixing, and lastly including compressing (i.e., tableting) with use of a molding machine.

Such a batch method needs scaling-up several times in order to shift from a small molding machine for research and development to a large molding machine for commercial use. The batch method also needs a verification experiment for each scaling-up, which increases the frequency of using a raw powdery material and needs enormous costs. The batch method also includes standby periods between the processes. For example, compressing with use of a molding machine needs previously mixing a powdery material and feeding the molding machine with the powdery material obtained by mixing. The molding machine needs to be in a stand-by condition without operating during the processes. In other words, the batch method fails to achieve timely feeding of an intermediate product. The batch method also needs facility design for each of the processes and occupation of a large space. More specifically, each of the processes needs a separate chamber and delivery by a worker of an intermediate product to a chamber for the subsequent process.

In view of this, there has been developed a system configured to continuously execute mixing and compressing of a powdery material (i.e., directly feed a molding machine with a powdery material having high quality with a high mixing degree (e.g., see JP 2017-001081 A and JP 2017-177137 A)). This system achieves feed of the powdery material from a powdery-material feeding device to the molding machine that continuously executes compressing and tableting.

The powdery-material feeding device configured to mix powdery materials includes a plurality of feeders each configured to reserve a powdery material and discharge the reserved powdery material, and is configured to mix the powdery materials discharged from the feeders and then feed the mixed-powdery materials to the molding machine and to an equipment configured to execute a post process. Typical examples of the feeders include a volumetric feeder (e.g., see JP 2018-154431 A) configured to continuously discharge a constant amount of a powdery material per a predetermined time. The volumetric feeder is configured to deliver a powdery material dropping from a hopper reserving the powdery material by a screw feeder, a table feeder, a circle feeder (registered trademark), a rotary feeder, or the like. The volumetric feeder discharges the powdery material having a discharge flow rate per unit time, which is measured by a measuring instrument such as a load cell. A motor functioning as a drive source of the screw feeder or the like is feedback controlled to cause the discharged powdery material to have a target flow rate.

Each of the feeders included in the powdery-material feeding device is requested to be subjected to, before its use, tuning of measuring a relation between control input (or a manipulated variable) to the motor (i.e., a rotational speed of the motor), or a current or a voltage applied to a coil of the motor, and control output (or a controlled variable) of the feeder (i.e., the flow rate of the powdery material discharged from the feeder when the motor drives a transfer member such as a screw blade).

The feeder has input and output characteristics varied by characteristics of the powdery material reserved in the hopper such as flowability, bulk density, water content, and particle size distribution, as well as shape, size, and other specifications of the transfer member, and a reduction ratio of a speed reducer interposed between the motor and the transfer member. Tuning is important for continuous feed of a desired amount of a powdery material from the powdery-material feeding device to the equipment configured to execute a post process and being in operation.

Tuning has been conventionally executed in a state where a target feeder is temporarily detached from the powdery-material feeding device and a predetermined control input is applied to the motor to measure an amount of a discharged powdery material. The target feeder is reattached at an original position in the powdery-material feeding device after completion of the tuning.

The tuning thus needs detaching and attaching the feeder, which leads to an increase in labor and work. Furthermore, the entire powdery material discharged from the feeder upon the tuning is uselessly discarded.

SUMMARY OF THE INVENTION

The exemplary invention has been devised in view of the above problems for the first time, and it is an exemplary feature of the present invention to reduce labor and work for tuning a feeder included in a powdery-material feeding device, as well as to reduce an amount of a useless powdery material discarded by tuning.

The exemplary invention provides a processing system including a powdery-material feeding device having at least one feeder configured to discharge a reserved powdery material, and an equipment having a filling device configured to be fed with the powdery material discharged from the feeder in the powdery-material feeding device and configured to execute a post process using the powdery material filled by the filling device, in which, upon a start of the equipment having stopped filling with the powdery material by the filling device and executing the post process, the feeder in the powdery-material feeding device preliminarily supplies the filling device with a predetermined amount of the powdery material while the equipment is stopped, and the equipment is subsequently started to fill with the powdery material by the filling device and execute the post process, and when the feeder in the powdery-material feeding device supplies the filling device with the predetermined amount of the powdery material before the start of the equipment being stopped, the processing system executes tuning of measuring a relation between control input provided to a motor of the feeder and a flow rate of the powdery material discharged from the feeder.

A powdery material is an aggregate of minute solids and conceptually includes an aggregate of particles such as so-called "granules" and an aggregate of powder smaller than such particles. Examples of the powdery material include a powdery material containing a principal agent (i.e., a main ingredient or an active ingredient), an excipient appropriately increasing volume and weight of a molded product, a lubricant preventing the powdery material from adhering to a die bore or a punch, a binder binding particles of the powdery material, starch serving as a disintegrant absorbing moisture to enable easy disintegration of the molded product, and an additive exemplified by a stabilizer stabilizing quality like crystalline cellulose or a carbonate, or a preservative prolonging shelf life. The powdery material according to the exemplary invention also includes a mixture of two or more types of powdery materials, and a mixture of a powdery principal agent and a powdery additive.

The exemplary invention enables tuning of the feeder without being detached from the powdery-material feeding device. Furthermore, the powdery material discharged from the feeder upon tuning is fed to the equipment configured to execute the post process, entire of which is not uselessly discarded.

The exemplary invention further may achieve a benefit that the filling device included in the equipment configured to execute the post process and being stopped can be preliminarily supplied with the predetermined amount of the powdery material, so that the equipment exhibits necessary and sufficient performance immediately after the equipment starts.

Optionally, before the start of the equipment being stopped, the feeder in the powdery-material feeding device supplies the filling device with the predetermined amount of the powdery material in batches and the equipment is subsequently started. Malfunctions can be more reliably avoided during a period immediately after the equipment starts. In addition, there are more measurement opportunities for tuning of the feeder, which leads to improvement in tuning accuracy.

Optionally, the at least one feeder in the powdery-material feeding device includes a plurality of feeders, and mixes powdery materials discharged from the feeders at predetermined ratios and then feeds the powdery materials to the filling device of the equipment, the filling device is supplied with a predetermined amount of the powdery materials obtained by mixing the powdery materials discharged from the plurality of feeders in the powdery-material feeding device at the predetermined ratios before the start of the equipment being stopped, and the processing system executes tuning of measuring a relation between control input provided to the motor of each of the feeders and a flow rate of the powdery material discharged from the corresponding feeder. The plurality of feeders can be simultaneously tuned efficiently, and the equipment being stopped can be supplied with mixed-powdery materials obtained by appropriately mixing a plurality of powdery materials.

Preferably, when the feeder in the powdery-material feeding device supplies the filling device with the predetermined amount of the powdery material before the start of the equipment being stopped, the processing system executes tuning of measuring an amount of the powdery material discharged from the feeder during provision of input for control of the motor of the feeder to a first rotational speed, and measuring an amount of the powdery material discharged from the feeder during provision of input for control to a second rotational speed different from the first rotational speed.

Examples of the equipment include a compression-molding machine including a table having a vertically-penetrating die bore, the filling device facing the die bore of the table and configured to be displaced relatively to the table and fill, with a powdery material, the die bore passing immediately below the filling device, and an upper punch and a lower punch configured to compress the powdery material filled in the die bore to obtain a molded product. In this case, the powdery-material feeding device is configured to feed, with a powdery material, the filling device in the compression-molding machine before being started and in operation after being started. This configuration avoids or inhibits defectiveness of a molded product, which tends to occur during a period immediately after the compression-molding machine starts.

Optionally, the powdery-material feeding device includes a feeder configured to store and to discharge a powdery material of a principal agent, and a separate feeder configured to store and discharge a powdery material of an additive to the principal agent, and is configured to mix the principal agent and the additive at predetermined ratios to feed the filling device in the compression-molding machine, and before start of the compression-molding machine being stopped, the filling device is supplied with a predetermined amount of powdery materials including the principal agent and the additive discharged from the plurality of feeders in the powdery-material feeding device and mixed at the predetermined ratios. This configuration achieves efficient production of a molded product such as a pharmaceutical tablet having appropriate content ratios between the principal agent and the additive immediately after the compression-molding machine starts.

The exemplary invention further provides a method of controlling a processing system including a powdery-material feeding device having at least one feeder configured to discharge a reserved powdery material, and an equipment having a filling device configured to be fed with the powdery material discharged from the feeder in the powdery-material feeding device and configured to execute a post process using the powdery material filled by the filling device, in which, upon a start of the equipment having stopped filling with the powdery material by the filling device and executing the post process, the feeder in the powdery-material feeding device preliminarily supplies the filling device with a predetermined amount of the powdery material while the equipment is stopped, and the equipment is subsequently started to fill with the powdery material by the filling device and to execute the post process, and when the feeder in the powdery-material feeding device supplies the filling device with the predetermined amount of the powdery material before the start of the equipment being stopped, the processing system executes tuning of measuring a relation between control input provided to a motor of the feeder and a flow rate of the powdery material discharged from the feeder.

The exemplary invention achieves a reduction of labor and work for tuning of the feeder included in the powdery-material feeding device, as well as a reduction in an amount of a useless powdery material discarded by tuning.

BRIEF DESCRIPTION OF THE DRAWIMGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
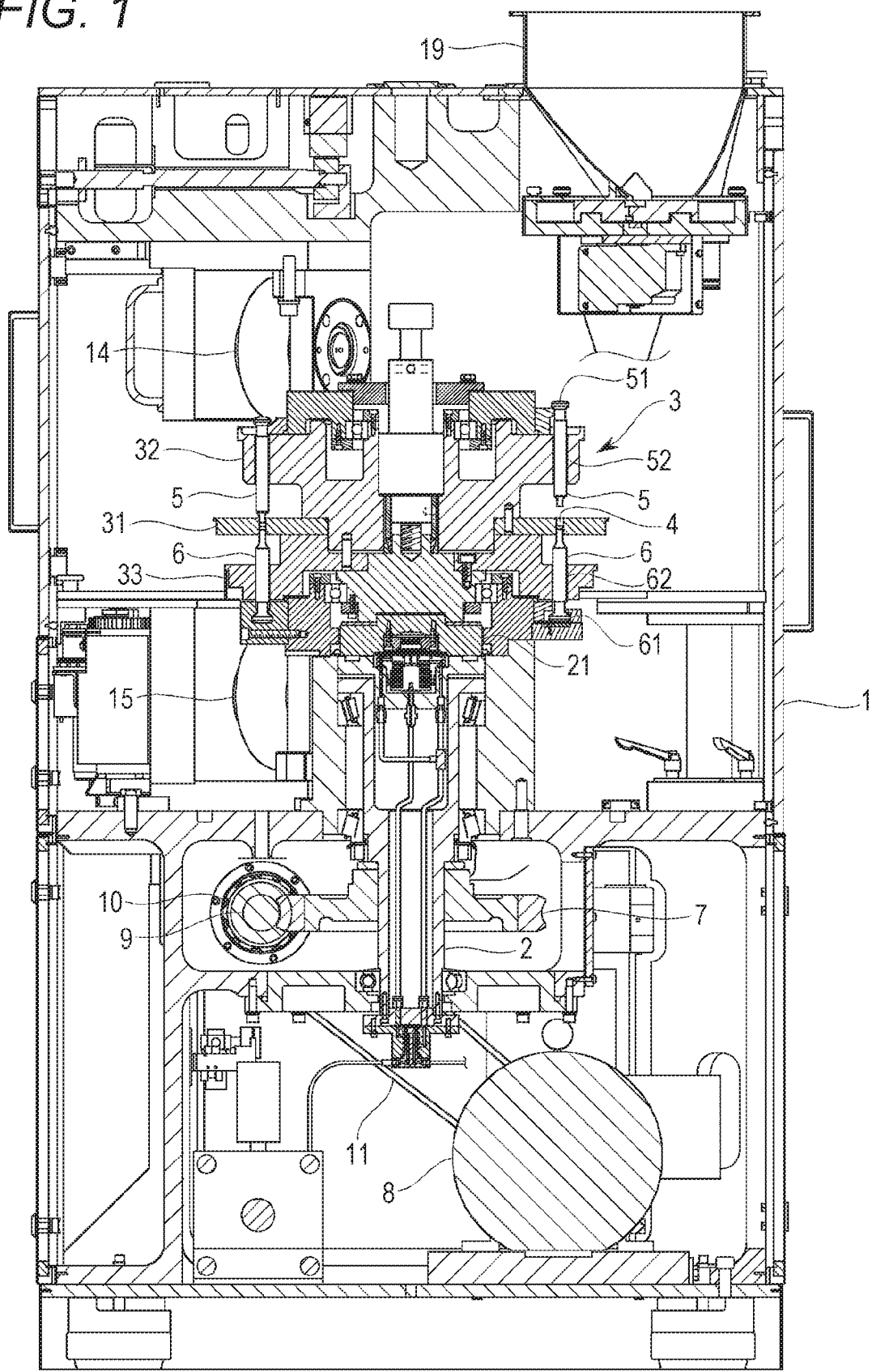
FIG. 1 is a side sectional view of a rotary compression-molding machine according to an embodiment of the exemplary invention.

An exemplary embodiment of the invention will now be described with reference to the drawings. Initially described is an overview of an entire rotary compression-molding machine (hereinafter, referred to as the "molding machine") according to the exemplary embodiment. As shown exemplarily in FIG. 1, the molding machine includes a frame 1 accommodating an upright shaft 2 that functions as a rotary shaft, and a turret 3 that is attached to a connection portion 21 disposed at the top of the upright shaft 2. A worm wheel 7 is attached to the lower end of the upright shaft 2. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to rotate the upright shaft 2 by way of the worm gear 10 and the worm wheel 7. Rotation of the upright shaft 2 causes rotation of the turret 3 and upper and lower punches 5 and 6.

Figure 2:
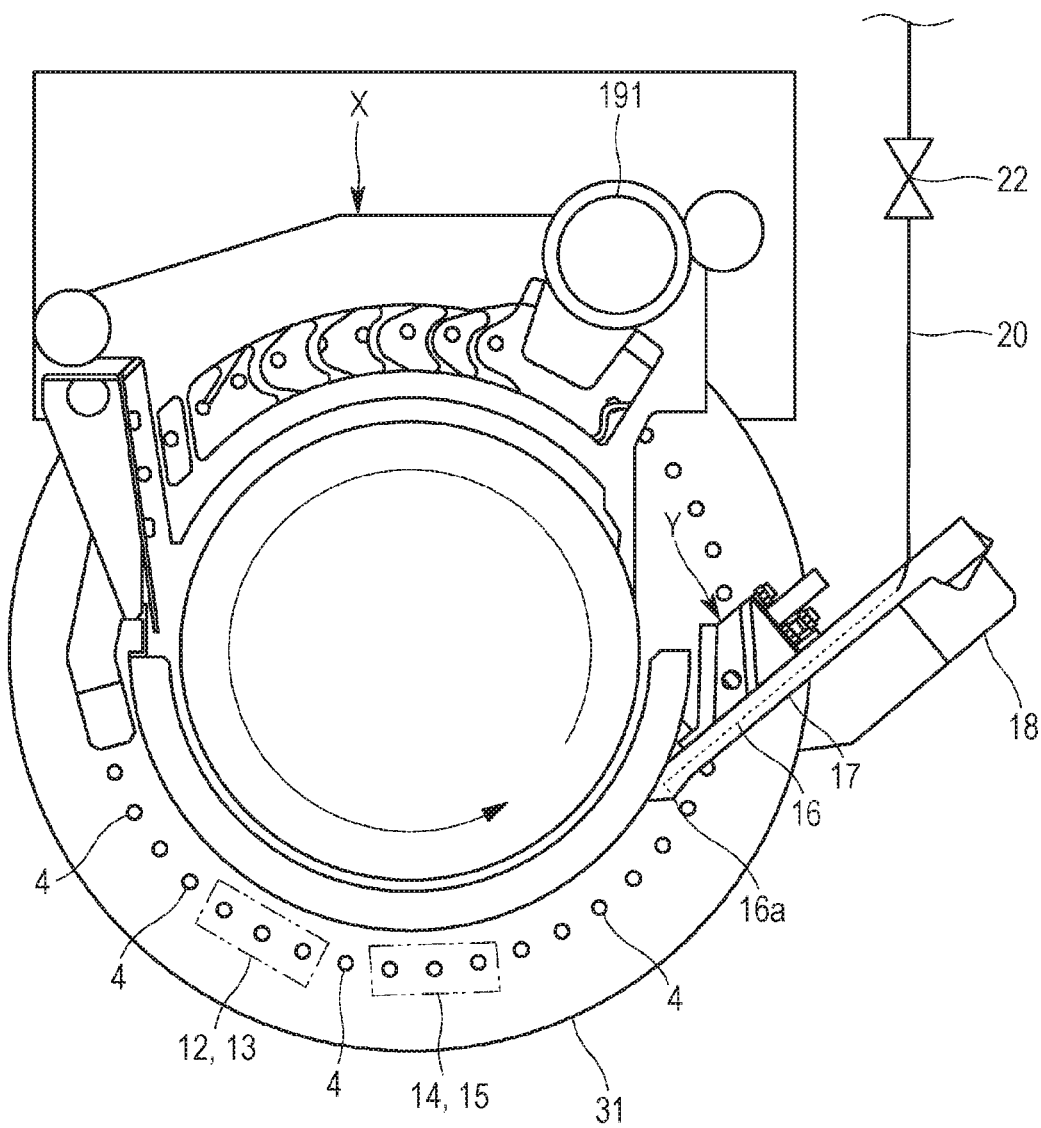
FIG. 2 is a plan view of a main part of the rotary compression-molding machine according to the exemplary embodiment.

The turret 3 horizontally rotates about the upright shaft 2, and more specifically, spins. The turret 3 includes a table (e.g., die disc) 31, an upper punch-retaining portion 32, and a lower punch-retaining portion 33. As shown exemplarily in FIG. 2, the table 31 has a substantially circular disc shape, and has a plurality of die bores 4 that is disposed in an outer circumferential portion and is aligned in a direction of rotation at predetermined intervals. Each of the die bores 4 vertically penetrates the table 31. The table 31 can alternatively include a plurality of divided plates. Instead of the die bores 4 formed directly in the table 31, a die member including the die bores 4 can be attached to the table 31.

The upper and lower punches 5 and 6 are disposed above and below each of the die bores 4 and are individually vertically slidable along the die bores 4. The upper punch-retaining portion 32 retains upper punch trunks 52 while the lower punch-retaining portion 33 retains lower punch trunks 62. The upper punches 5 each have a tip 53 that enters and exits corresponding one of the die bores 4. The lower punches 6 each have a tip 63 that is kept inserted in corresponding one of the die bores 4. The upper and lower punches 5 and 6 horizontally rotate about the upright shaft 2 along with the turret 3, more specifically, revolve.

Figure 16:
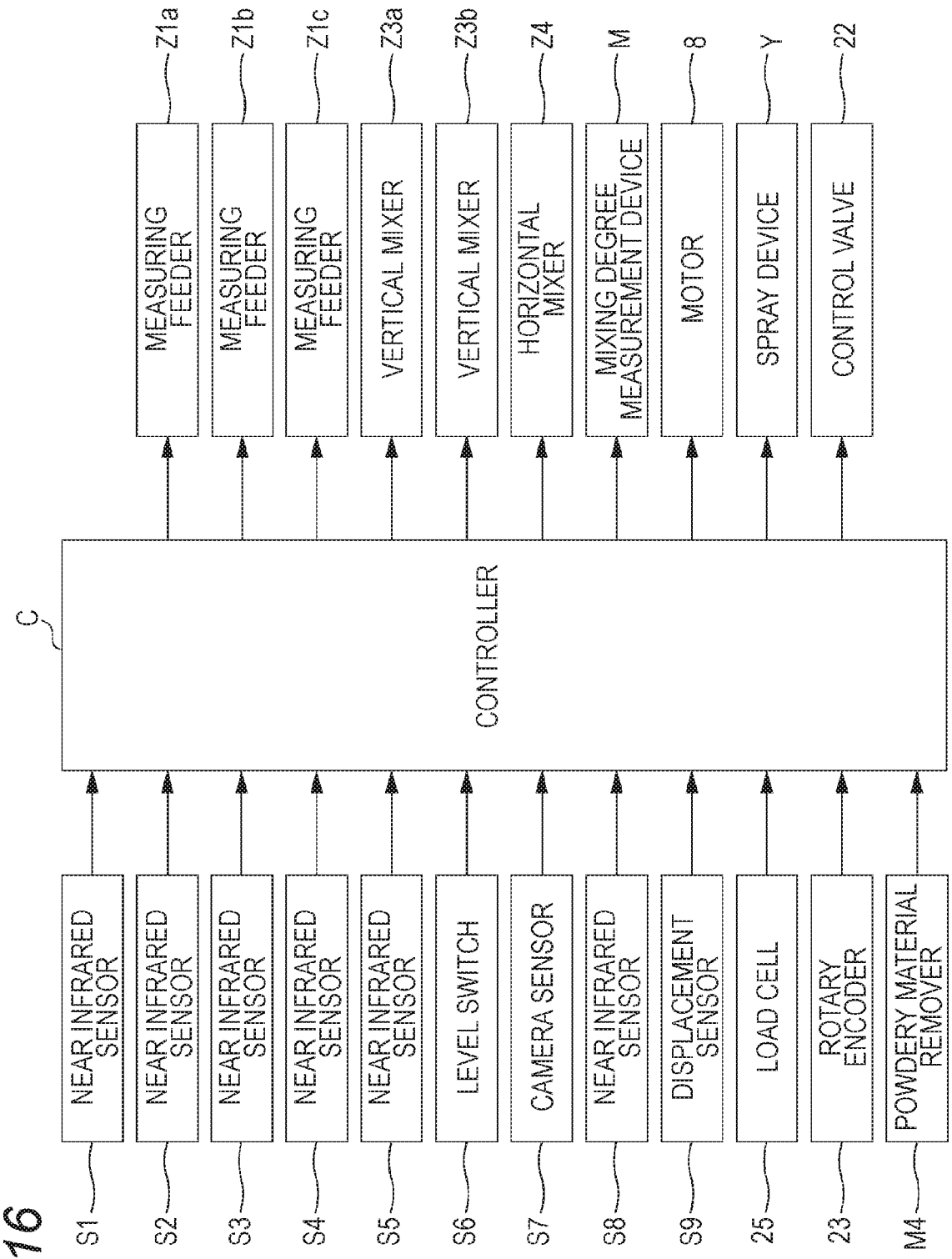
FIG. 16 is a block diagram of a control system in a system according to the exemplary embodiment.
Figure 17:
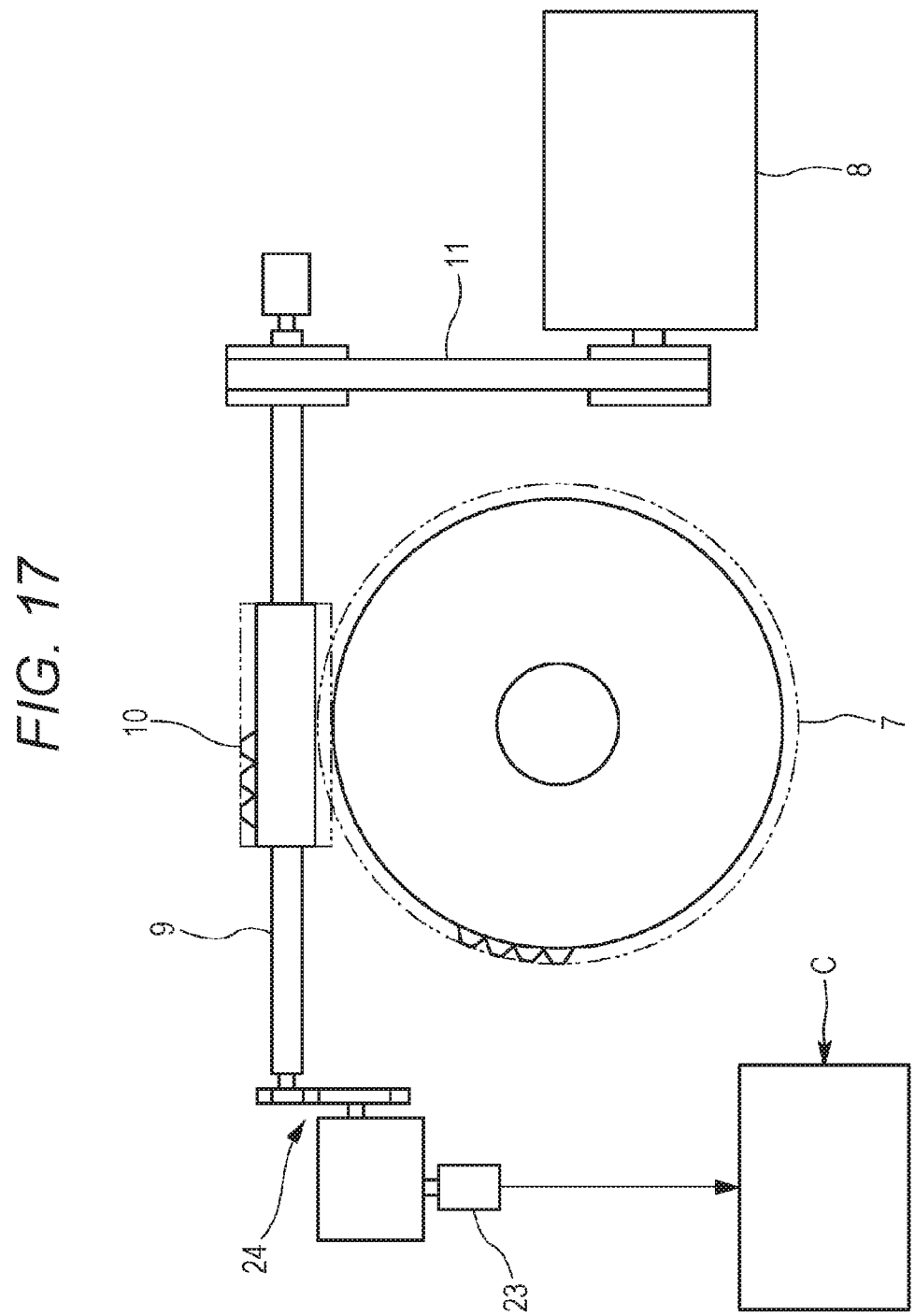
FIG. 17 is a plan view of a main part including a mounting position of a rotary encoder in the rotary compression-molding machine according to the exemplary embodiment.

As shown exemplarily in FIG. 17, the gear shaft 9 has an end connected, via a reduction gear 24, with a rotary encoder 23 configured to detect a rotation angle and rotational speed of the gear shaft 9 as well as (the table 31, the die bores 4, and the punches 5 and 6 of) the turret 3. The rotary encoder 23 outputs a pulse signal every time the gear shaft 9 rotates by a predetermined angle. Upon receipt of a train of the pulse signals, a controller C included in a system according to the exemplary embodiment is configured to detect the rotation angle and the rotational speed of the turret 3 (i.e., find a current position of each of the die bores 4 on the table 31). Examples of the controller C shown exemplarily in FIG. 16 include a microcomputer system including a processor, a memory, an auxiliary storage device, an input/output interface, a programmable controller, a general-purpose personal computer, and a work station. The reduction gear 24 reduces the rotational speed of the gear shaft 9 to be adapted to input speed of the rotary encoder 23 and transmits the reduced rotational speed to the rotary encoder 23.

A feeder X functioning as a filling device is provided to fill the die bores 4 of the turret 3 with a powdery material. The feeder X can be a gravity feeder configured to simply drop a powdery material into the die bores 4 or an agitated feeder configured to drop, into the die bores 4, a powdery material being agitated by rotating an incorporated agitating rotor. The exemplary embodiment assumes that the feeder X is the agitated feeder. The feeder X is positioned on the outer circumferential portion of the rotating table 31, particularly, just above a revolution orbit of the die bores 4. The table 31 rotating along with the turret 3 causes the feeder X to be displaced relatively to the table 31 and the die bores 4.

Figure 10:
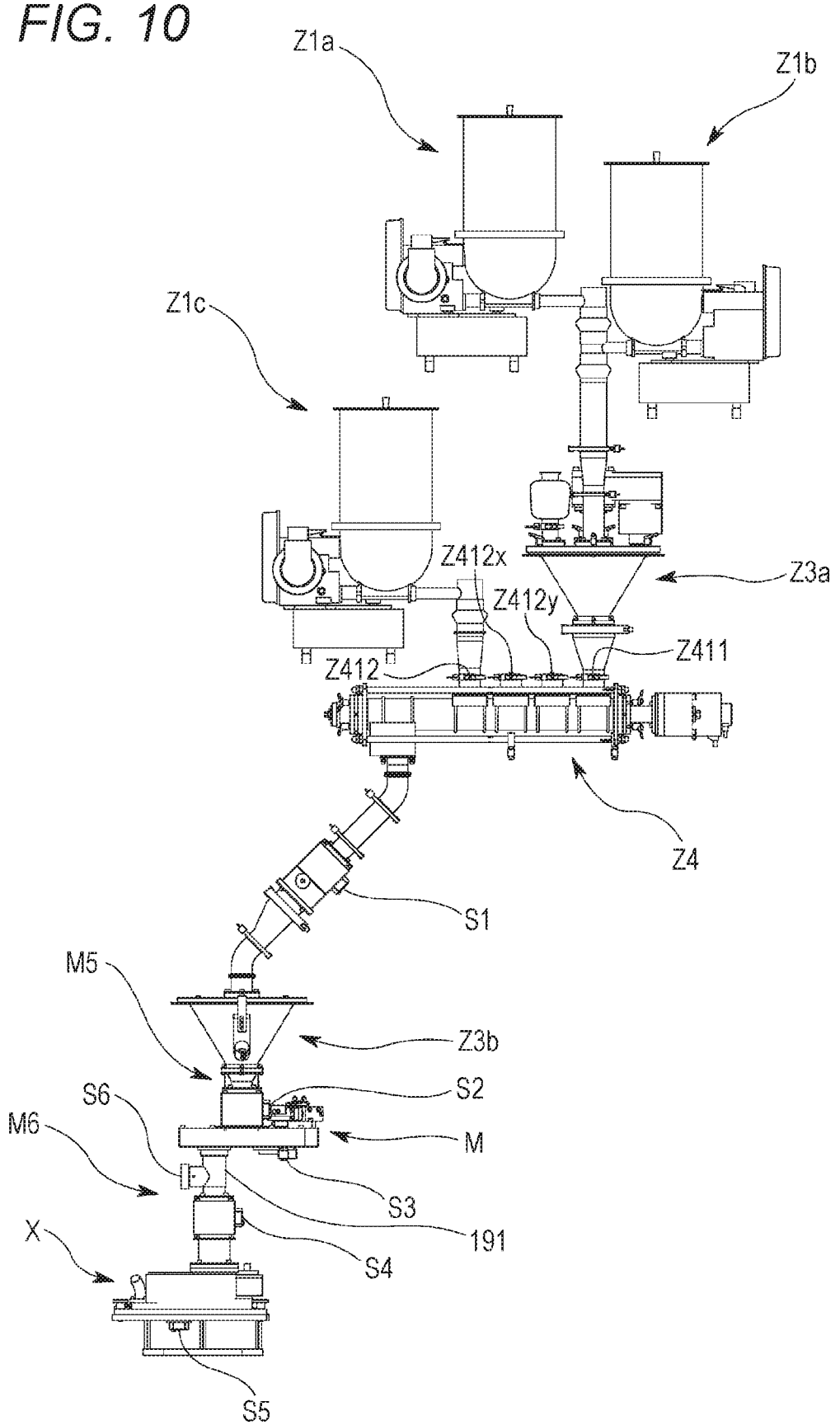
FIG. 10 is a side view of a main part of the powdery-material feeding device according to the exemplary embodiment.
Figure 11:
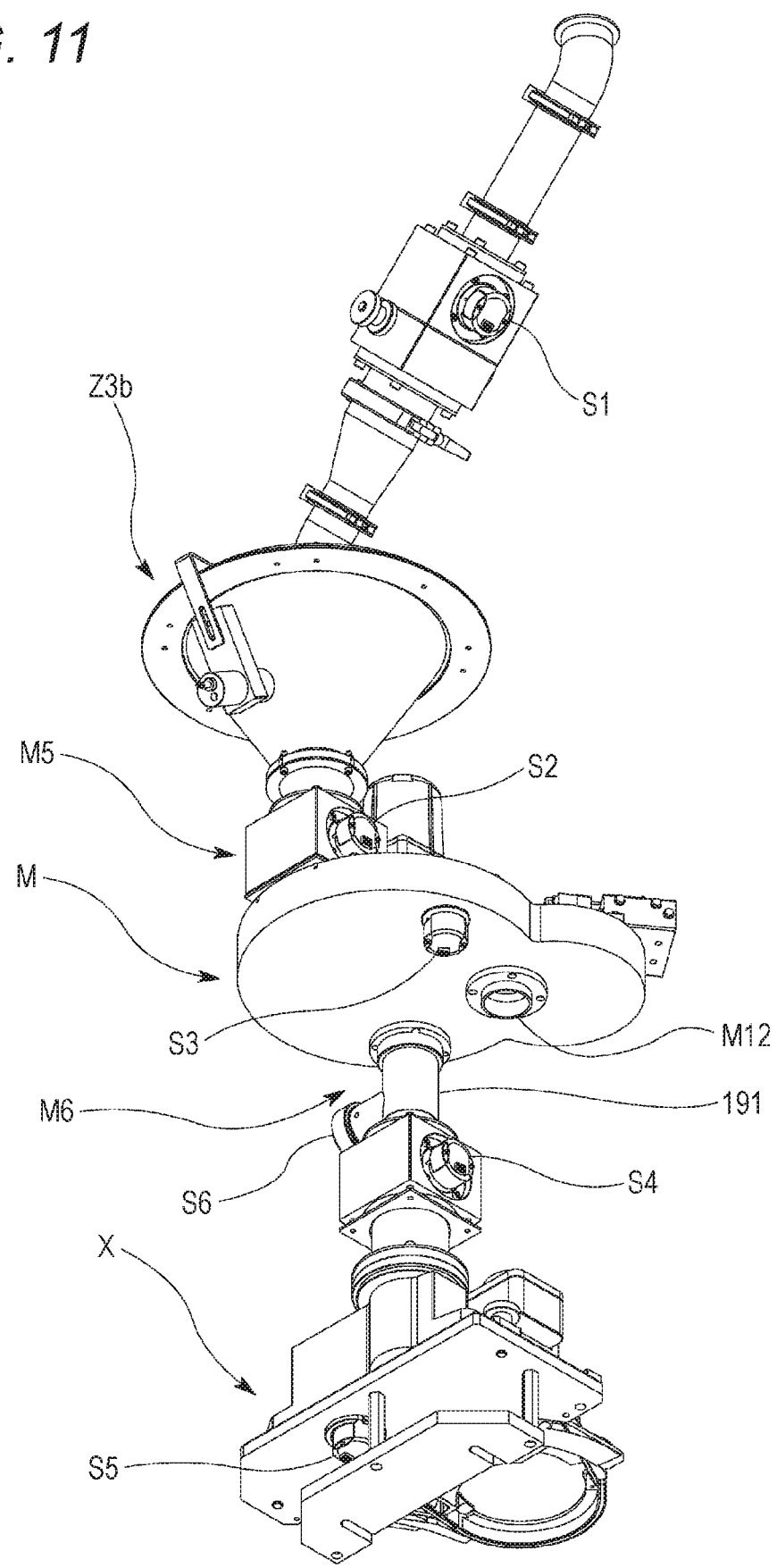
FIG. 11 is a perspective view of the main part of the powdery-material feeding device according to the exemplary embodiment.

A powdery material is fed to the feeder X from a powdery material feed pipe 191 (e.g., shown in FIGS. 10 and 11) functioning as a discharger M6 of a powdery-material mixing degree measurement device M. A buffer tank Z3b is applied to feed a feeding unit M5 of the powdery-material mixing degree measurement device M with a powdery material.

A spray device Y is configured to spray an external lubricant toward inner circumferential surfaces of the die bores 4, upper end surfaces of the tips 63 of the lower punches 6, and lower end surfaces of the tips 53 of the upper punches 5. The lubricant prevents binding of part of a powdery material adhering to the inner circumference of the die bore 4 and sticking of part of the powdery material adhering to the tip 53 or 63 of the punch 5 or 6 (e.g., both of which may cause a scratch, roughness, or chipping of a product). Examples of the lubricant include wax made of metal stearate (particularly magnesium stearate) or the like, and talc.

Figure 19:
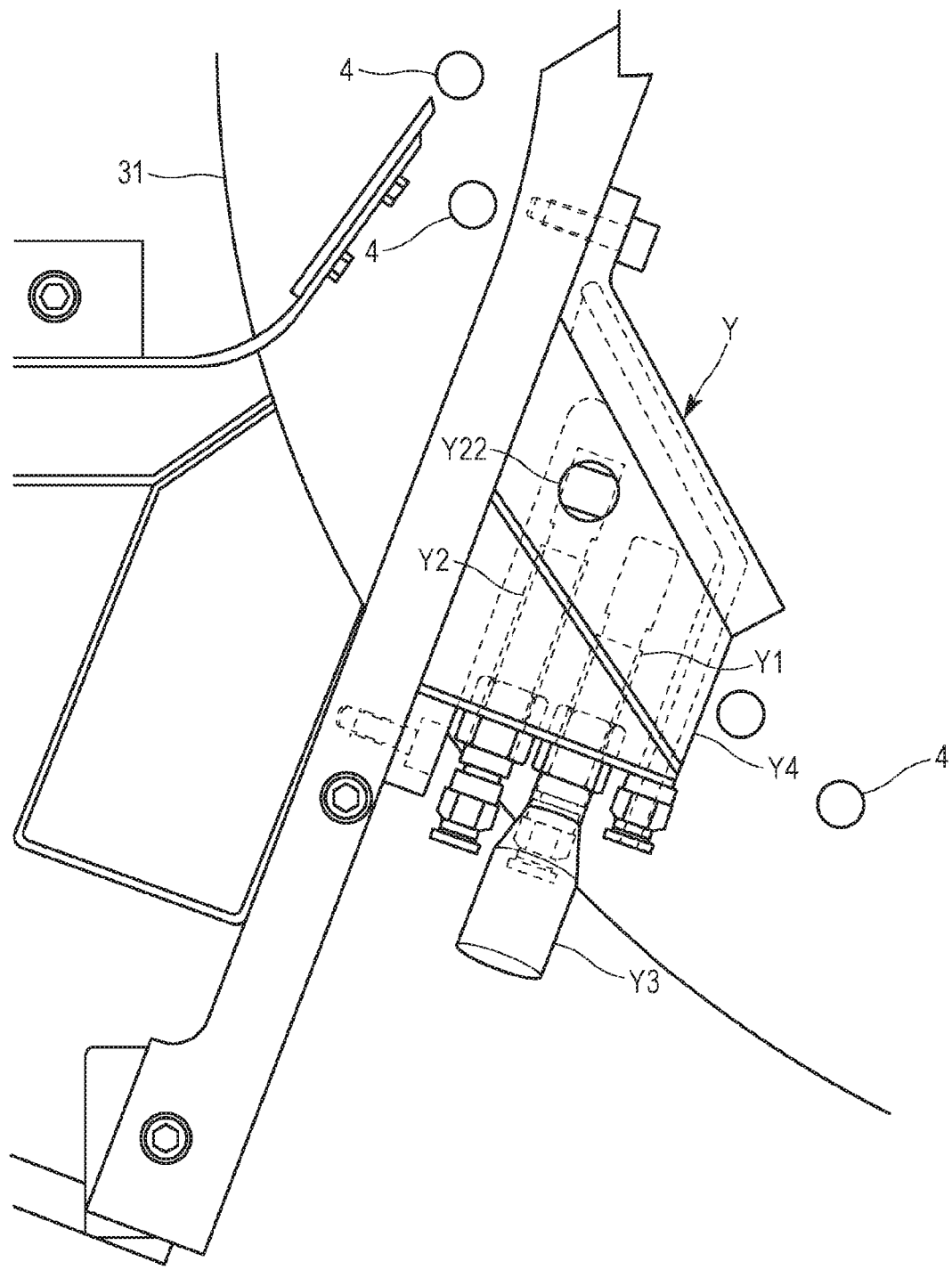
FIG. 19 is an enlarged plan view of a main part of a spray device in the rotary compression-molding machine according to the exemplary embodiment.

As shown exemplarily in FIG. 19, the spray device Y includes, as its elements, a downward spray nozzle Y1 configured to guide a lubricant fed from an external lubricant feeding device (not shown) and to spray the lubricant toward the die bore 4 and the upper end surface of the tip 63 of the lower punch 6, an upward spray nozzle Y2 configured to guide a lubricant fed from the lubricant feeding device and to spray the lubricant toward the lower end surface of the tip 53 of the upper punch 5, a purging suction duct Y3 configured to suck an excessive lubricant or the like not adhering to the die bore 4 or the tip 53 or 63 of the punch 5 or 6 and to discharge the sucked lubricant or the like (e.g., the lubricant may be fed back to the lubricant feeding device) and a case Y4 retaining the downward spray nozzle Y1, the upward spray nozzle Y2, and the suction duct Y3.

Figure 20:
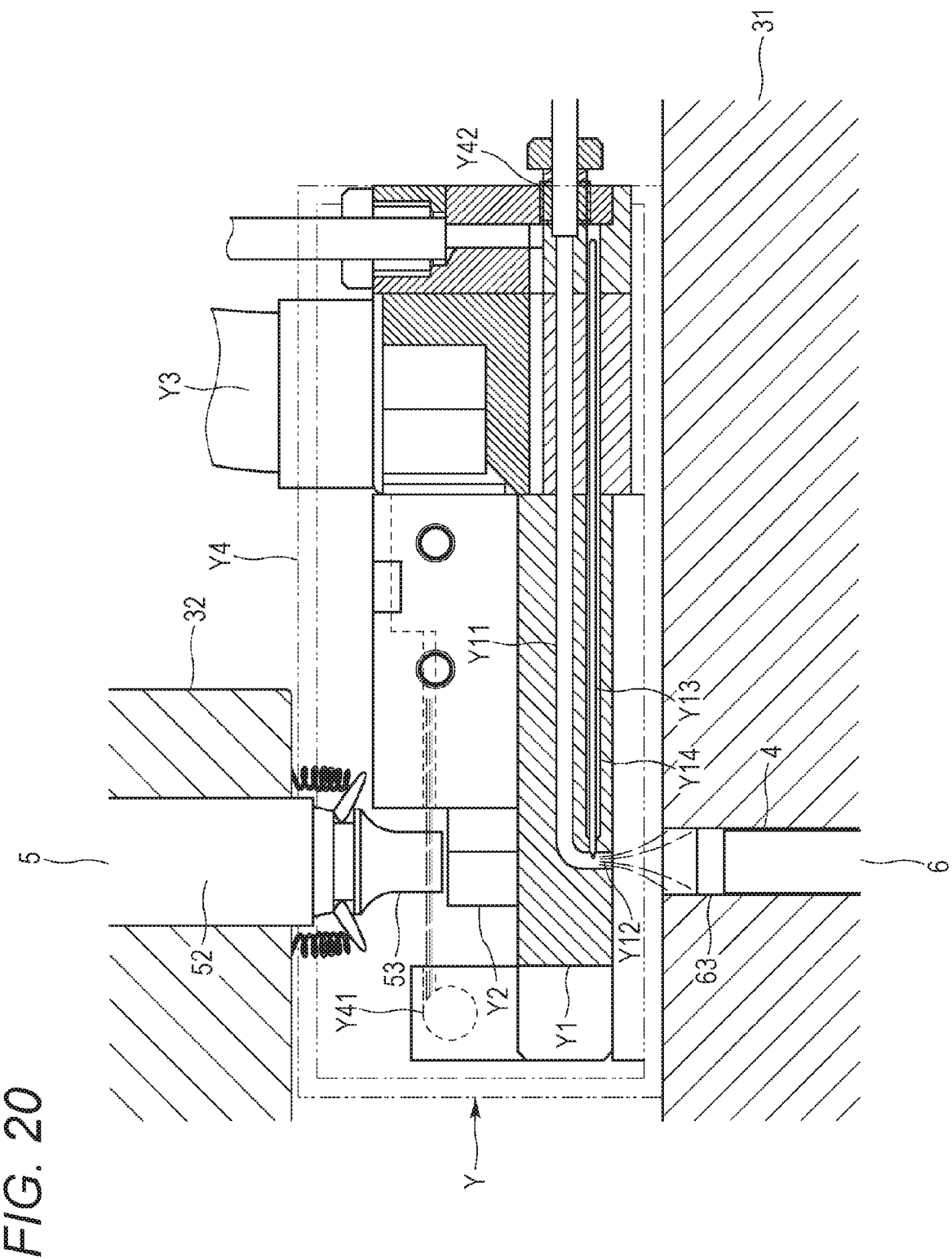
FIG. 20 is a side sectional view of the main part of the spray device in the rotary compression-molding machine according to the exemplary embodiment.

As shown exemplarily in FIG. 20, the downward spray nozzle Y1 has a distribution pipe Y11 bored in a block made of a fluororesin (e.g., particularly polytetrafluoroethylene) so as to extend in a substantially horizontal direction, and a spray port Y12 formed by bending downward the terminal end of the distribution pipe Y11 so as to be opened to the lower surface of the block. The distribution pipe Y11 and the spray port Y12 have inner surfaces as flat surfaces of the fluororesin, thereby smoothing distribution and spraying of the lubricant. The downward spray nozzle Y1 has a static electricity generation electrode Y13 buried therein. The static electricity generation electrode Y13 has a distal end in a needle or a tapered shape, which protrudes in an area near the spray port Y12. The static electricity generation electrode Y13 receives a high DC voltage of about −20 kV, and forcibly electrostatically charges the lubricant immediately before being sprayed with an electric field concentrated at the distal end thereof.

The upward spray nozzle Y2 is structured such that the downward spray nozzle Y1 shown exemplarily in FIG. 20 is placed upside down. More specifically, the upward spray nozzle Y2 has a distribution pipe formed by boring a hole in a block made of a fluororesin and extending in a substantially horizontal direction, and a spray port Y22 formed by bending upward the terminal end of the distribution pipe so as to be opened to the upper surface of the block. The upward spray nozzle Y2 also has a static electricity generation electrode buried therein. The static electricity generation electrode has a distal end in a needle or tapered shape, which protrudes in an area near the spray port Y22.

The suction duct Y3 is disposed at a level to face a side of the tip 53 of the upper punch 5. The suction duct Y3 has an opening portion fixed to the case Y4 and communicating with an internal space of the case Y4.

The case Y4 is a box that is made of a fluororesin and mostly covers the downward spray nozzle Y1 and the upward spray nozzle Y2 so as to prevent random dispersion of the lubricant. The case Y4 is electrically insulated from the turret 3 and the spray nozzles Y1 and Y2. The case Y4 has an air curtain Y41 of compressed air blown out substantially in a horizontal direction toward the opening of the suction duct Y3. The air curtain Y41 forms an air flow near the tip 53 of the upper punch 5, and prevents upward scatter of the lubricant that is sprayed from the upward spray nozzle Y2 toward the tip 53 of the upper punch 5.

The external lubricant feeding device includes a µR feeder (e.g., manufactured by NISSHIN ENGINEERING INC.) configured to eject the lubricant accurately and stably little by little through a filling roll of a thin-groove filling type and pneumatically feed the ejected lubricant along with pressurized air.

The lubricant fed from the lubricant feeding device is divided into the downward spray nozzle Y1 and the upward spray nozzle Y2, flows through the distribution pipes in the nozzles Y1 and Y2, and is sprayed out of the spray ports Y12 and Y22. The lubricant being sprayed is forcibly electrostatically charged. The die bore 4 and the punches 5 and 6 are grounded via the ground of the turret 3. The electrostatically charged lubricant strongly adheres to the inner circumferential surface of the die bore 4, the upper end surface of the tip 63 of the lower punch 6, and the lower end surface of the tip 53 of the upper punch 5, which are metal surfaces. The lubricant having adhered is not separated by vibration caused by vertical motion of the punches 5 and 6 or by wind pressure caused by rapid rotation of the turret 3, is pressed strongly against a powdery material simultaneously when the punches 5 and 6 compression mold the powdery material, and is transferred from the die bore 4 and the tips 53 and 63 of the punches 5 and 6 to adhere to a tablet.

Figure 3:
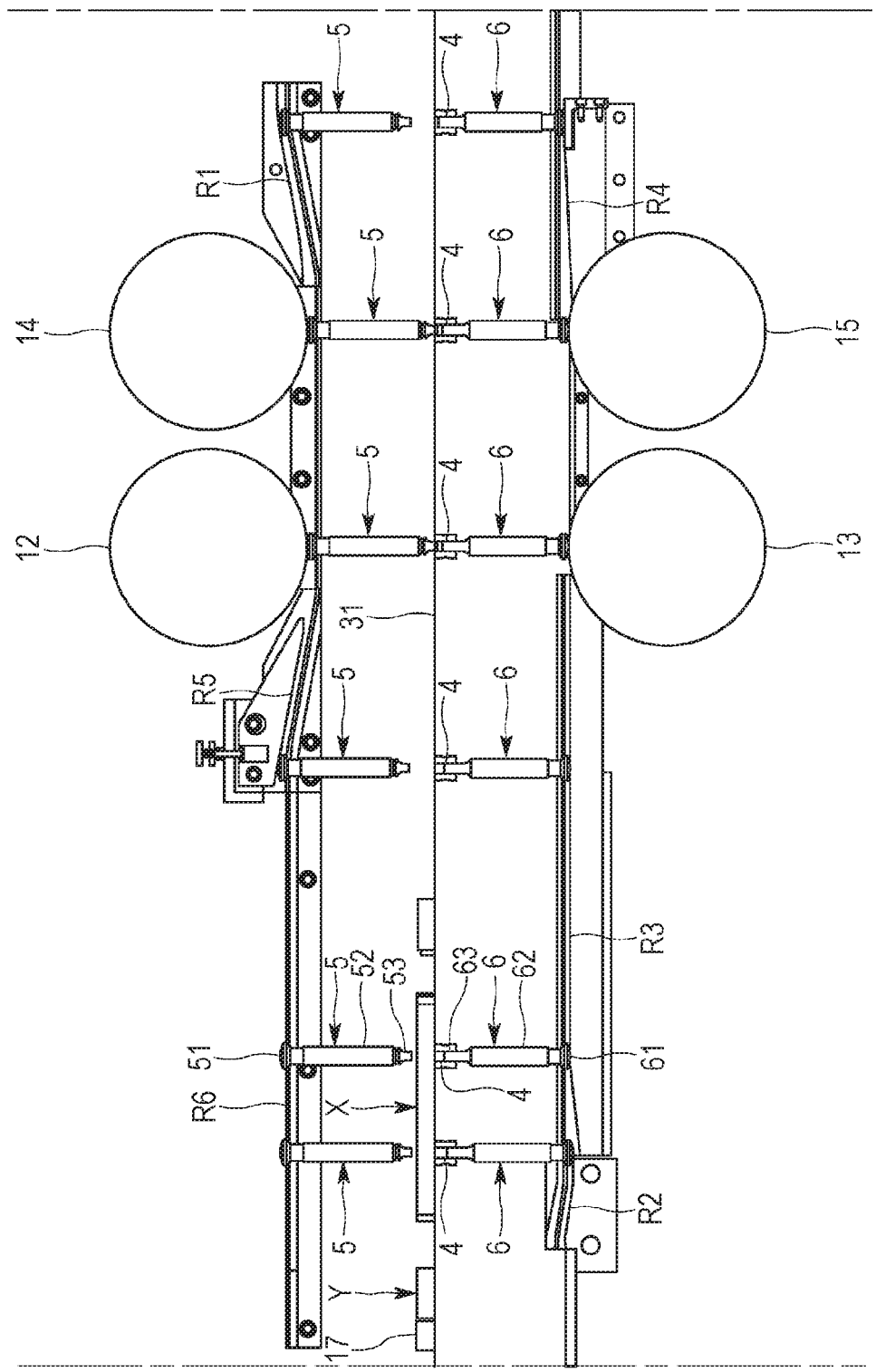
FIG. 3 is a cylindrical view of the rotary compression-molding machine according to the exemplary embodiment.

As shown exemplarily in FIG. 3, a preliminary compression upper roll 12, a preliminary compression lower roll 13, a substantial compression upper roll 14, and a substantial compression lower roll 15 are disposed on orbits of the upper and lower punches 5 and 6 that revolve about the upright shaft 2. The preliminary compression upper roll 12 and the preliminary compression lower roll 13, as well as the substantial compression upper roll 14 and the substantial compression lower roll 15, are respectively paired in the vertical direction so as to sandwich the upper and lower punches 5 and 6. The preliminary compression upper roll 12 and the substantial compression upper roll 14 each press a head 51 of each of the upper punches 5, and the preliminary compression lower roll 13 and the substantial compression lower roll 15 each press a head 61 of each of the lower punches 6. The preliminary compression upper roll 12 and the preliminary compression lower roll 13, as well as the substantial compression upper roll 14 and the substantial compression lower roll 15, bias the upper and lower punches 5 and 6 to come closer to each other, so that end surfaces of the tips 53 and 63 compress from above and below a powdery material filled in the die bores 4.

The upper and lower punches 5 and 6 have the heads 51 and 61 pressed by the rolls 12, 13, 14, and 15, and the trunks 52 and 62 smaller in diameter than the heads 51 and 61. The upper punch-retaining portion 32 of the turret 3 vertically slidably retains the trunks 52 of the upper punches 5, whereas the lower punch-retaining portion 33 vertically slidably retains the trunks 62 of the lower punches 6. The tips 53 and 63 of the trunks 52 and 62 are thinner than the remaining portions and are substantially equal in diameter to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying required pressure to a powdery material in the die bores 4.

Figure 18:
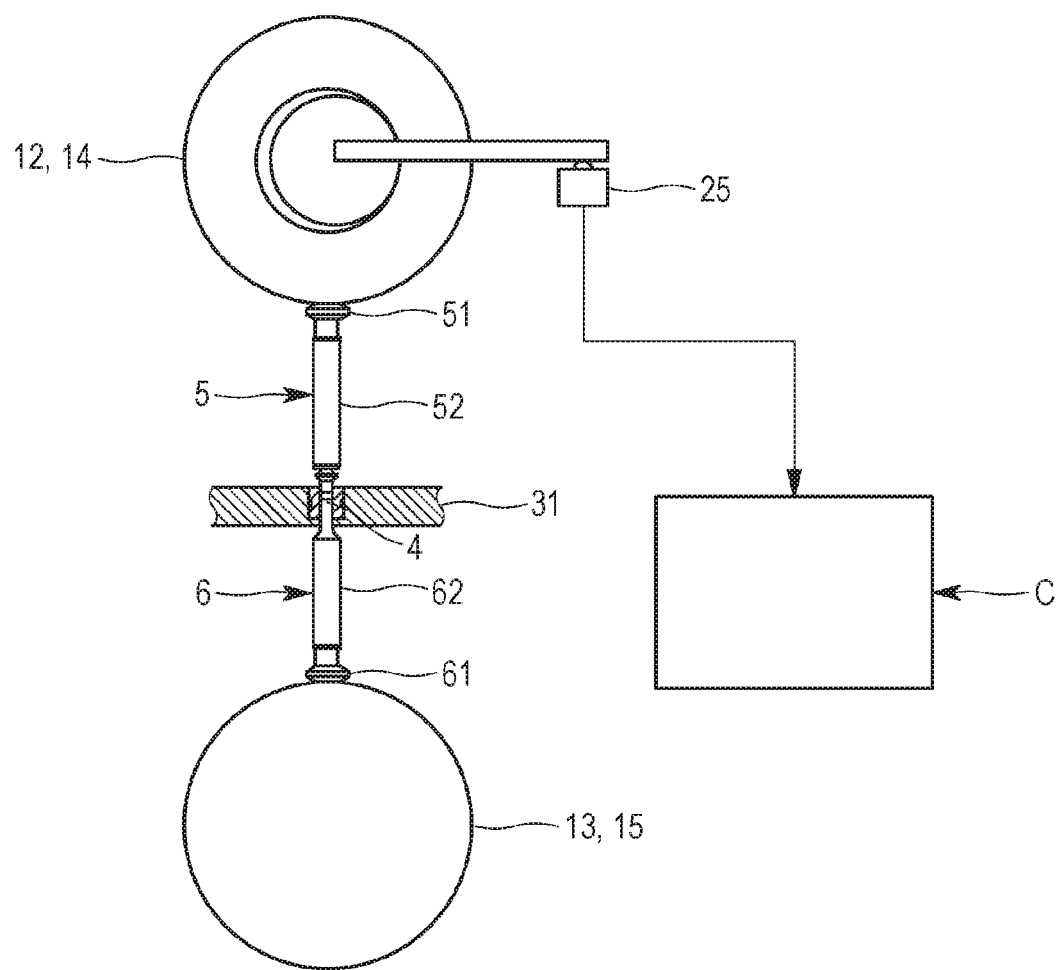
FIG. 18 is a configuration diagram of a roll and a load cell included in the rotary compression-molding machine according to the exemplary embodiment.

As shown exemplarily in FIG. 18, the upper rolls 12 and 14 of the molding machine each have a load cell 25 configured to detect pressure applied to compress the powdery material in the die bore 4 by the rolls 12, 13, 14, and 15 via the punches 5 and 6. The controller C receives a signal transmitted from each of the load cells 25 disposed at the rolls 12, 13, 14, and 15 to find a magnitude of pressure applied to compress the powdery material by the preliminarily compression rolls 12 and 13 (i.e., preliminary compression pressure) and a magnitude of pressure applied to compress the powdery material by the substantial compression rolls 14 and 15 (i.e., substantial compression pressure). The signals outputted from the load cells 25 form a pulse signal train having a peak when each of the pairs of punches 5 and 6 compresses the powdery material in a corresponding one of the die bores 4 with a maximum pressure. The controller C counts the number of pulse signal trains to find the number of molded products produced by the molding machine per unit time.

A molded-product collector is disposed downstream, in the direction of rotation of the turret 3 and the upper and lower punches 5 and 6, of the position where the substantial compression upper roll 14 and the substantial compression lower roll 15 apply pressure. This molded-product collector includes a guide member 17 configured to guide a molded product pushed out of each of the die bores 4. The guide member 17 extends to have a proximal end located at a molded-product collecting position 18 and a distal end located closer to the center of the table 31 than a rotation locus of the die bores 4. A molded product pushed out of each of the die bores 4 by the corresponding lower punch 6 comes into contact with the guide member 17 and moves toward the molded-product collecting position 18.

Vertical motion of the upper and lower punches 5 and 6 are caused by cam rails R1, R2, R3, R4, R5, and R6. The rails R1, R2, R3, R4, R5, and R6 extend along the direction of rotation (i.e., revolution) of the punches 5 and 6, and are engaged with the heads 51 and 61 of the punches 5 and 6 to guide and vertically move the punches 5 and 6.

As shown exemplarily in FIG. 3, the head 51 of each of the upper punches 5 has a revolution orbit including the ascending rail (i.e., ascending cam) R1 configured to lift the upper punch 5 upward at a position upstream of the guide member 17 and extract the tip 53 from the die bore 4, and the descending rail (i.e., descending cam) R5 configured to push the upper punch 5 downward at a position upstream of the rolls 12 and 14 and insert the tip 53 to the die bore 4 to be ready for later compression of the powdery material.

The head 61 of each of the lower punches 6 has a revolution orbit including the push-up rail R4 configured to lift the lower punch 6 upward at a position upstream of the guide member 17 to allow the tip 63 to be substantially as high as the upper surface of the table 31, the lowering unit R2 configured to pull the lower punch 6 downward at a position upstream of or adjacent to the feeder X to set volume of the die bore 4 above the tip 63 to correspond to the amount of the powdery material as a constituent material for the molded product, and the quantity control rail R3 configured to slightly lift the lower punch 6 upward at a position downstream of the feeder X to finely adjust the amount of the powdery material to be filled in the die bore 4. The quantity control rail R3 has a latter half configured to slightly pull the lower punch 6 downward to prevent the powdery material having been adjusted in quantity and filled in the die bore 4 from spilling from the die bore 4 due to centripetal force or the like.

A process of producing a molded product will be described briefly. As shown exemplarily in FIG. 3, the lower punch 6 initially descends and the spray device Y sprays the lubricant toward the inner circumferential surface of the die bore 4 into which the tip 63 of the lower punch 6 is inserted, the upper end surface of the tip 63 of the lower punch 6, and the lower end surface of the tip 53 of the upper punch 5 (i.e., external lubricant spraying). The feeder X fills, with a powdery material (i.e., mixed-powdery materials), the die bore 4 into which the tip 63 of the lower punch 6 is inserted (i.e., filling). The lower punch 6 ascends and the powdery material overflowing the die bore 4 is leveled such that the die bore 4 is filled with a required amount of the powdery material.

The upper punch 5 then descends, and the preliminary compression upper roll 12 and the preliminary compression lower roll 13 press the head 51 of the upper punch 5 and the head 61 of the lower punch 6, such that the tips 53 and 63 of the punches 5 and 6 preliminarily compress the powdery material in the die bore 4. The substantial compression upper roll 14 and the substantial compression lower roll 15 subsequently press the head 51 of the upper punch 5 and the head 61 of the lower punch 6, such that the tips 53 and 63 of the punches 5 and 6 substantially compress the powdery material in the die bore 4 (i.e., compression molding).

The lower punch 6 then ascends until the upper end surface of the tip 63 of the lower punch 6 substantially reaches the level of the upper end of the die bore 4 (i.e., the top surface of the table 31), and pushes a molded product out of the die bore 4 onto the surface of the turret 3. The molded product pushed out of the die bore 4 is brought into contact with the guide member 17 by a rotation of the turret 3, and moves along the guide member 17 to the molded-product collecting position 18.

The molded-product collector of the molding machine according to the exemplary embodiment has a molded product removal mechanism W configured to select a specific molded product such as a sampled product or a defective product from among molded products collected at the molded-product collecting position 18. Specifically, the guide member 17 is provided therein with an air passage 16 for a pressurized air flow, and the air passage 16 has a distal end functioning as an air spray nozzle 16*a* opened outward in the radial direction of the turret 3. A flow passage 20 connects an air feed source (not shown) such as a pump configured to feed pressurized air and the air passage 16, and a control valve 22 is disposed on the flow passage 20 to open and close the flow passage 20. Examples of the control valve 22 include an electromagnetic solenoid configured to open in accordance with a control signal transmitted from the controller C or the like.

If the control valve 22 is opened when a specific molded product pushed out of the die bore 4 passes by the air spray nozzle 16a before contacting the guide member 17, then the air spray nozzle 16a discharges pressurized air fed from the air feed source through the flow passage 20 and the air passage 16 in the guide member 17. The discharged air blows the specific molded product outward from the table 31. The blown molded product will not reach the molded-product collecting position 18 ahead of the guide member 17. As described above, the molded product removal mechanism W in the molding machine includes the passages 16 and 20 for air fed from the air feed source, the spray nozzle 16a, and the control valve 22.

The molded product removal mechanism W is also configured to sample a tabletted molded product.

Described below is a device configured to feed the buffer tank Z3b with a powdery material, specifically, a powdery-material feeding device (i.e., powdery-material mixing and feeding device) Z configured to deliver the powdery material toward the feed pipe 191 directly connected to the feeder X. As shown exemplarily in FIGS. 4 and 5, the powdery-material feeding device Z according to the exemplary embodiment includes a plurality of measuring feeders Z1 (e.g., Z1a, Z1b, and Z1c). The number and disposition of the measuring feeders Z1 may change depending on the number of types of powdery materials to be mixed, and are thus not limited uniquely. As shown exemplarily in the figures, there are the two measuring feeders Z1a and Z1b positioned upstream of a vertical mixer Z3a and configured to discharge powdery materials that join before reaching the vertical mixer Z3a and are mixed by the vertical mixer Z3a. The feeders Z1 may alternatively include three or more feeders disposed upstream of the vertical mixer Z3a. There may still alternatively be only one measuring feeder Z1 disposed upstream of the vertical mixer Z3a.

The first to third measuring feeders Z1a to Z1c according to the exemplary embodiment measure and feed different types of powdery materials. These measuring feeders Z1a to Z1c can alternatively measure and feed a single type of a powdery material. The first measuring feeder Z1a, the second measuring feeder Z1b, and the third measuring feeder Z1c according to the exemplary embodiment can measure and feed a principal agent, a powdery material of an excipient like lactose or the like, and a lubricant, respectively.

Figure 4:
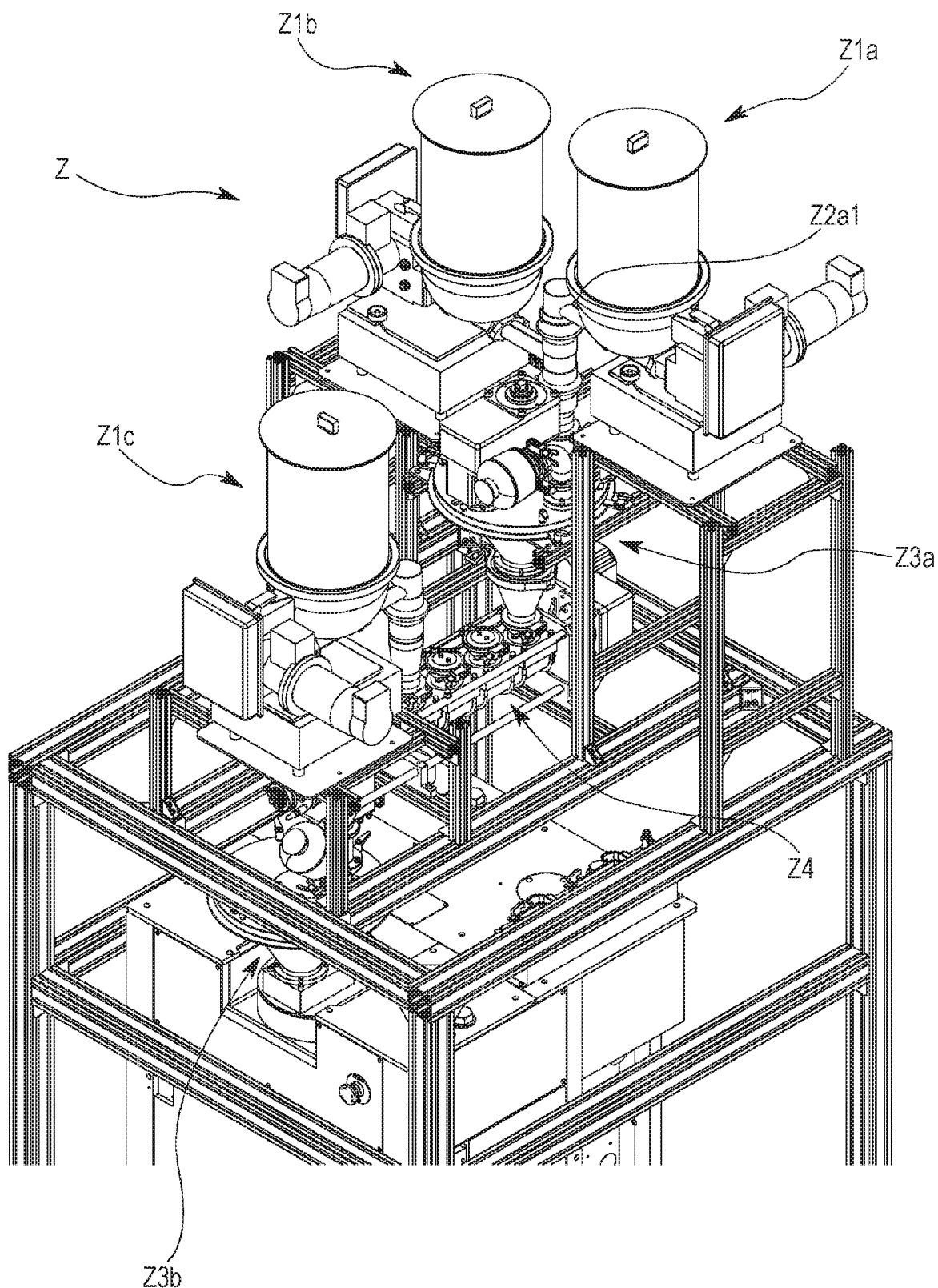
FIG. 4 is a perspective view of a powdery-material feeding device according to the exemplary embodiment.
Figure 5:
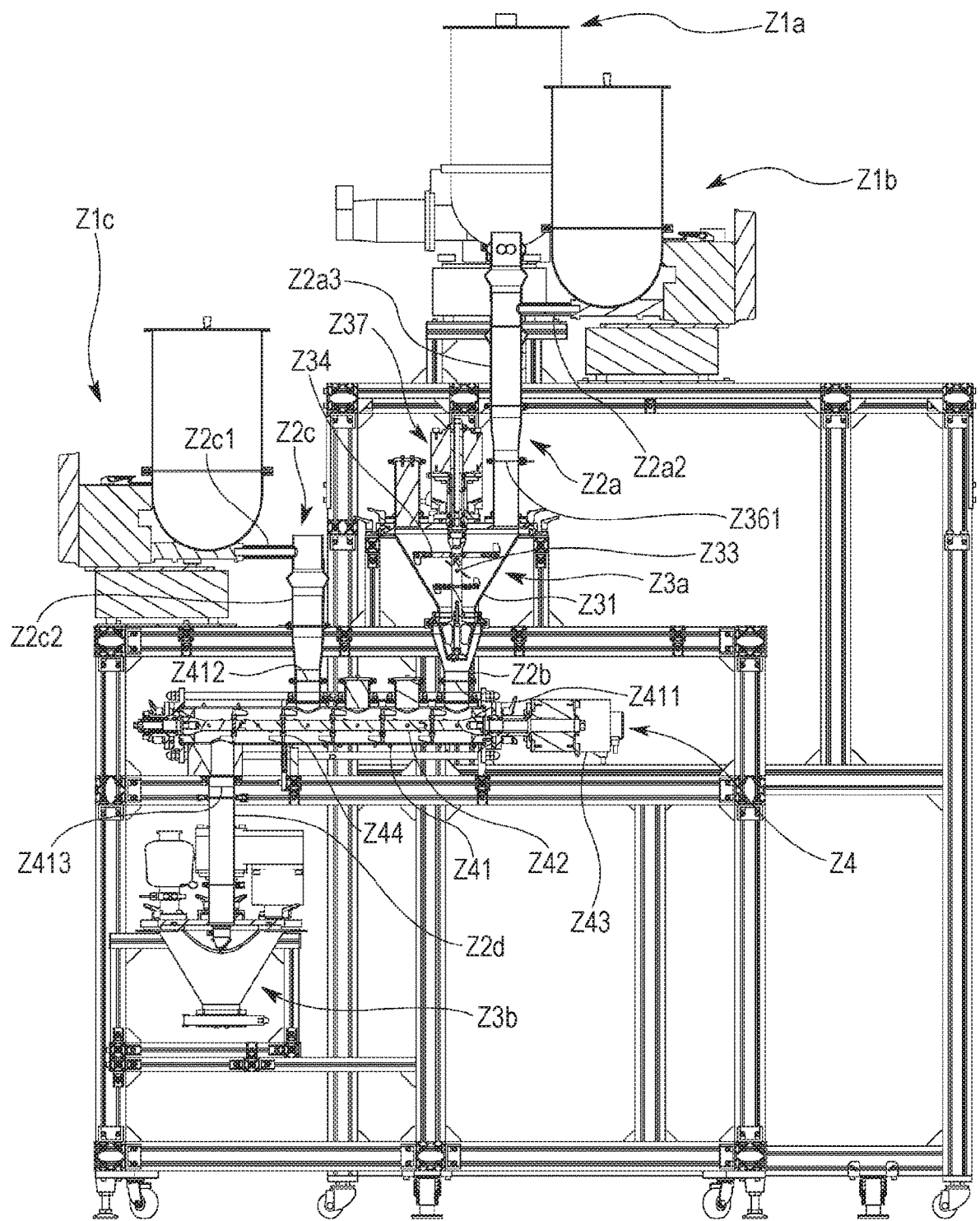
FIG. 5 is a side view of the powdery-material feeding device according to the exemplary embodiment.
Figure 6:
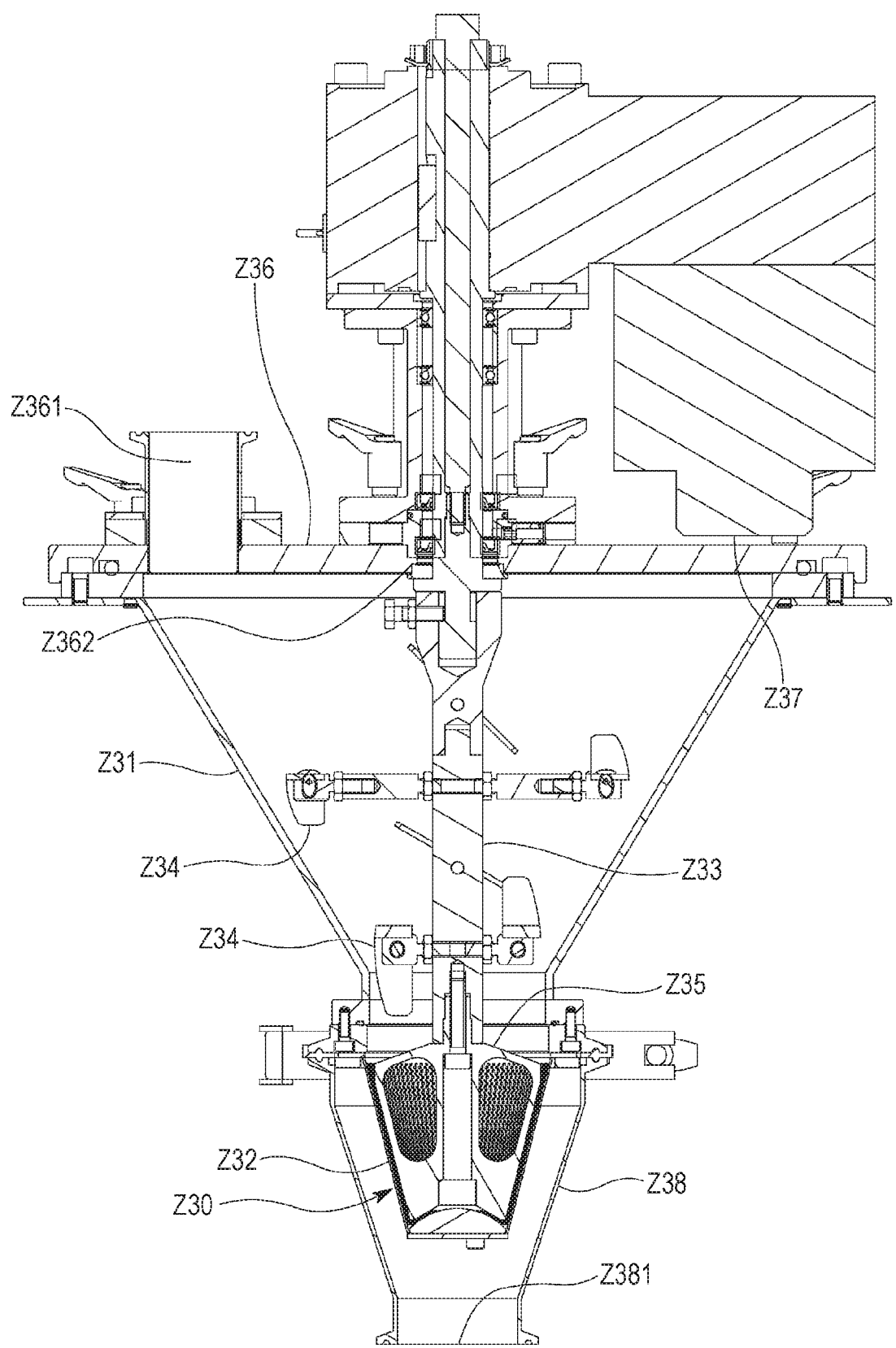
FIG. 6 is a side sectional view of a vertical mixer included in the powdery-material feeding device according to the exemplary embodiment.

As shown exemplarily in FIGS. 4 and 5, the powdery-material feeding device Z includes the first measuring feeder Z1a, the second measuring feeder Z1b, a vertical mixer (i.e., a first mixer) Z3, a first connecting pipe Z2a connecting the measuring feeders Z1 (e.g., Z1a and Z1b) and a vertical mixer Z3a, a horizontal mixer (i.e., a second mixer) Z4, a second connecting pipe Z2b connecting the vertical mixer Z3a and the horizontal mixer Z4, a third connecting pipe Z2c connecting the third measuring feeder Z1c and the horizontal mixer Z4, and a fourth connecting pipe Z2d connecting the horizontal mixer Z4 and the buffer tank Z3b. FIG. 4 is a perspective view showing a state where the powdery-material feeding device Z is attached to the molding machine. FIG. 5 is a side view of the powdery-material feeding device Z.

The first measuring feeder Z1a and the second measuring feeder Z1b measure the powdery materials, namely, the principal agent and the excipient or the like, respectively, and simultaneously feed the first connecting pipe Z2a with the powdery materials. The third measuring feeder Z1c measures the powdery material, namely, the lubricant, and simultaneously feeds the third connecting pipe Z2c with the powdery material (i.e., measuring and feeding). These measuring feeders Z1 are configured as known volumetric feeders according to a loss in weight system (i.e., loss integrated value system) or the like.

Figure 21:
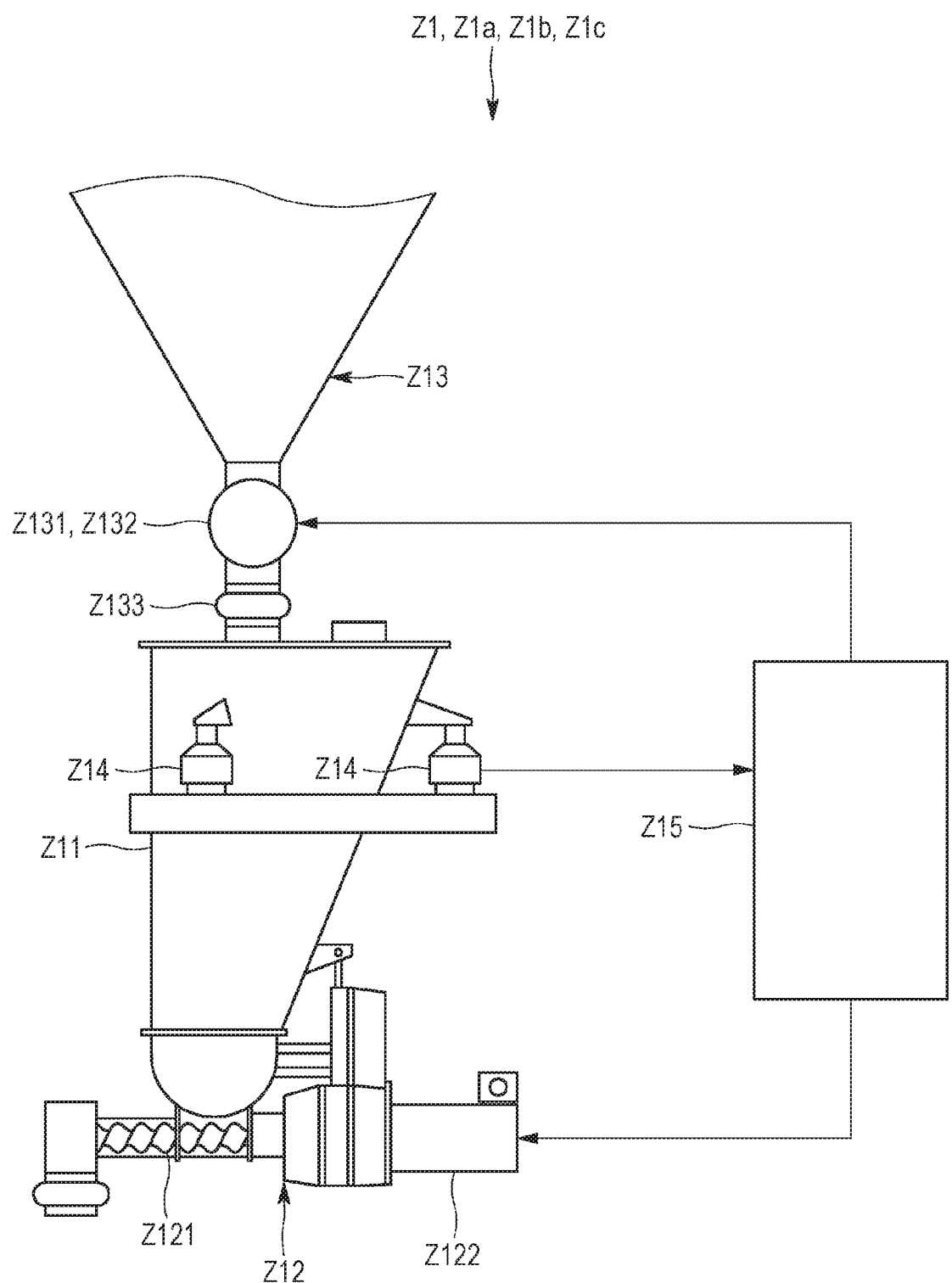
FIG. 21 is a side view of a feeder included in the powdery-material feeding device according to the exemplary embodiment.

The volumetric feeders Z1 will be further described below. As exemplarily shown in FIG. 21, the feeders Z1a, Z1b, and Z1c each include a hopper Z11 configured to reserve a powdery material, a transfer mechanism Z12 configured to deliver to discharge the powdery material fed from the hopper Z11, a supply mechanism Z13 configured to timely supply the hopper Z11 with a powdery material, a measuring instrument Z14 configured to measure a flow rate per unit time of the powdery material delivered to be discharged by the transfer mechanism Z12, and a control unit Z15 configured to control the transfer mechanism Z12 to cause the flow rate of the discharged powdery material to have a required target value.

The transfer mechanism Z12 includes a transfer member Z121 configured to be in contact with the powdery material dropped from the hopper Z11 and deliver the powdery material, and a motor Z122 configured to drive to rotate the transfer member Z121. Examples of the transfer mechanism Z12 include a screw feeder, a table feeder, a circle feeder, a disk feeder, and a rotary feeder. The transfer member Z121 in the screw feeder Z12 is configured by a screw blade including a shaft configured to rotate about an axis and spiral blades attached to the shaft. The screw blade is configured to transfer a powdery material caught between the adjacent blades along the axis. The transfer member in the table feeder, the circle feeder, the disk feeder, or the rotary feeder is configured by a rotary table, a flat bar (i.e., rotary blade), a disk, or a rotor (equipped in a rotary valve), respectively. The exemplary embodiment assumes that the transfer mechanism Z12 is configured by a screw feeder. The exemplary embodiment does not inhibit adoption of a feeder configured differently.

The motor Z122 configured to drive the transfer member Z121 has a rotational speed influencing a flow rate per unit time of a powdery material delivered by the transfer mechanism Z12. Increase in the rotational speed of the motor Z122 typically leads to an increase in a flow rate of a delivered powdery material per unit time. Examples of the motor Z122 (and a motor Z132 of the supply mechanism Z13 to be described later) include a direct current (DC) motor, particularly a blushless DC motor. The DC motor has basic properties expressed by the following equations.

$$V_M = R_a I_a + E_a$$

$$E_a = K_e N$$

$$T = K_t I_a = -(K_t K_e N)/R_a + (K_t V_M)/R_a$$

In these equations, $V_M$ indicates a power supply voltage applied to a coil of the DC motor, $I_a$ indicates a current flowing through the coil of the DC motor, $R_a$ indicates an armature resistance, $E_a$ indicates a voltage of counter electromotive force, T indicates a torque generated by the DC motor, $K_t$ indicates a torque constant, $K_e$ indicates a counter electromotive force constant, and N indicates a rotational speed of the DC motor.

The supply mechanism Z13 is configured by a rotary feeder or the like, is disposed above the hopper Z11, and reserves a large amount of a powdery material to be supplied to the hopper Z11. The supply mechanism Z13 facing the hopper Z11 has a rotary valve Z131 disposed below the supply mechanism Z13. The supply mechanism Z13 opens the rotary valve Z131 to supply the hopper Z11 with the reserved powdery material when the powdery material in the hopper Z11 decreases to reach a predetermined lower limit amount. When the powdery material in the hopper Z11 increases to reach a predetermined upper limit amount, the supply mechanism Z13 closes the rotary valve Z131 to prevent the hopper Z11 from being supplied with any more powdery materials.

The measuring instrument Z14 is configured to repetitively detect a current weight of the hopper Z11 and the powdery material reserved in the hopper Z11. Decreased weight is equal to amounts of the powdery materials discharged from the feeders Z1. Examples of the measuring instrument Z14 include a load cell functioning as a strain gauge sensor, a tuning fork force sensor, and a force balance sensor. The supply mechanism Z13 and the hopper Z11 are connected to each other via a bellows joint Z133 or the like, to prevent weight of the supply mechanism Z13 itself and weight of the powdery material reserved in the supply mechanism Z13 (and to be supplied to the hopper Z11 later) from being applied to the hopper Z11. The measuring instrument Z14 does not detect the weight of the supply mechanism Z13 or the powdery material reserved in the supply mechanism Z13.

The control unit Z15 receives an output signal from the measuring instrument Z14 to obtain weight of the powdery material currently reserved in the hopper Z11, and controls the motor Z122 configured to drive the transfer member (i.e., the screw blade of the screw feeder) Z121 in the transfer mechanism Z12 and the motor Z132 configured to drive the rotor of the rotary valve Z131 in the supply mechanism Z13. The control unit Z15 includes, as elements, a motor driver configured to turn ON or OFF the motors Z122 and Z132 and control rotational speed or output torque (i.e., a level of current and/or voltage applied to the coils of the motors Z122 and Z132) of the motors Z122 and Z132, a microcomputer configured to command the motor driver to achieve target rotational speed or output torque of the motors Z122 and Z132, a programmable controller, a personal computer or a work station, and the like. The motor driver sequentially applies current to coils of respective phases included in the motors Z122 and Z132 to rotate the motors Z122 and Z132, and increases or decreases the level of the current flowing through each of the coils in the motors Z122 and Z132 in accordance with a pulse width modulation (PWM) control to control the rotational speed and the output torque of the motors Z122 and Z132.

The control unit Z15 in each of the volumetric feeders Z1 according to the exemplary embodiment basically feedback controls the flow rate per unit time of the powdery material discharged from the corresponding the feeder Z1. Specifically, the measuring instrument Z14 constantly measures weight of a powdery material discharged from the hopper Z11 to be delivered by the transfer mechanism Z12, compares the decreased weight and a preset target discharge flow rate to find whether or not the decreased weight transitions to match the target discharge flow rate, increases or decreases the rotational speed or the output torque of the motor Z122 to decrease the difference therebetween, and eventually increases or decreases the flow rate of the powdery material discharged from the feeder Z1. The target discharge flow rate is provided from the controller C in the system or is manually inputted by a user directly to the control unit Z15. Measuring the powdery materials to be fed and feeding the connecting pipes Z2a and Z2c with the powdery materials stabilizes contents of the principal agent and the like in a molded product.

The control unit Z15 further operates the motor Z132 configured to drive the rotor of the rotary valve Z131 in the supply mechanism Z13 to supply the hopper Z11 with the powdery material reserved in the supply mechanism Z13 when the powdery material in the hopper Z11 decreases to reach the predetermined lower limit amount, as described earlier. If the powdery material in the hopper Z11 increases to reach the predetermined upper limit amount, then the control unit Z15 stops the motor Z132 to prevent the hopper Z11 from being supplied with any more powdery materials.

The first connecting pipe Z2a connects the first measuring feeder Z1a and the second measuring feeder Z1b to the vertical mixer Z3a, and feeds the vertical mixer Z3a with the principal agent discharged from the first measuring feeder Z1a and the excipient or the like discharged from the second measuring feeder Z1b. The second connecting pipe Z2b connects the vertical mixer Z3a and the horizontal mixer Z4, and feeds the horizontal mixer Z4 with mixed-powdery materials including the principal agent and the excipient discharged from the vertical mixer Z3a. The third connecting pipe Z2c connects the third measuring feeder Z1c and the horizontal mixer Z4, and feeds the horizontal mixer Z4 with the lubricant discharged from the third measuring feeder Z1c. The fourth connecting pipe Z2d connects the horizontal mixer Z4 and the buffer tank Z3b, and feeds the buffer tank Z3b with mixed-powdery materials including the principal agent, the excipient, and the lubricant discharged from the horizontal mixer Z4.

More specifically, the first connecting pipe Z2a includes a first branch pipe Z2a1 connected with the first measuring feeder Z1a, a second branch pipe Z2a2 connected with the second measuring feeder Z1b, and a main pipe Z2a3 connected with the first branch pipe Z2a1 and the second branch pipe Z2a2. The main pipe Z2a3 has a lower end connected with the vertical mixer Z3a. The vertical mixer Z3a thus mixes the powdery materials measured and fed by the first measuring feeder Z1a and the second measuring feeder Z1b (i.e., first mixing).

The second connecting pipe Z2b, the third connecting pipe Z2c, and the fourth connecting pipe Z2d will be described later.

As shown exemplarily in FIGS. 5 to 8, the vertical mixer Z3a includes a lid Z36 having a feed port Z361 for a powdery material, a first case Z31 disposed below the lid Z36 and having a funnel shape, an agitation shaft Z33 disposed substantially in the center of the first case Z31 and configured to spin, an agitating rotor Z34 (i.e., first mixing member) attached to the agitation shaft Z33, a motor Z37 configured to rotate (i.e., spin) the agitation shaft Z33, a powdery material passing member Z32 disposed below the first case Z31 and having a plurality of bores Z321, an auxiliary rotor Z35 (i.e., first mixing member) configured to facilitate a powdery material to pass through the bores Z321 of the powdery material passing member Z32, and a second case Z38 covering the powdery material passing member Z32. The agitating rotor Z34 and the auxiliary rotor Z35 each function as the first mixing member. The configuration according to the exemplary embodiment includes both the agitating rotor Z34 and the auxiliary rotor Z35, while the exemplary invention is also applicable to another configuration including only one of the agitating rotor Z34 and the auxiliary rotor Z35.

The agitation shaft Z33 of the vertical mixer Z3a is not necessarily disposed vertically but can be slanted. The vertical mixer Z3a has only to be configured to agitate and mix a powdery material while the powdery material fed from the feed port Z361 is flowing downward.

The powdery materials fed through the feed port Z361 of the vertical mixer Z3a are mixed by rotation of the agitating rotor Z34 (i.e., first mixing). The powdery materials can alternatively be mixed by rotation of the auxiliary rotor Z35.

The lid Z36 includes the feed port Z361 and a shaft port Z362 allowing the agitation shaft Z33 to pass therethrough, and is shaped to cover an upper opening of the first case Z31. The lid Z36 is attached to the first case Z31 so as to prevent a powdery material from spilling or scattering from the first case Z31. The feed port Z361 of the lid Z36 is connected with the first connecting pipe Z2a. The powdery materials fed from the feed port Z361 into the first case Z31 are agitated and mixed by rotation of the agitating rotor Z34 and/or the auxiliary rotor Z35. The powdery material passing member Z32 disposed at a reservoir Z30 has the plurality of bores Z321 through which the mixed-powdery materials pass.

Adjustment in amount of the powdery materials fed from the feed port Z361 or increase in a rotational speed of the auxiliary rotor Z35 can cause the powdery materials fed from the feed port Z361 to be larger in amount than the powdery materials passing through the bores Z321. A certain amount of the powdery materials will thus remain in the reservoir Z30. Specifically, at least part of the powdery materials measured and fed by the first measuring feeder Z1a and the second measuring feeder Z1b remain in the reservoir Z30 in the vertical mixer Z3a (i.e., reserving) and are agitated by the auxiliary rotor Z35, to achieve improvement in mixing degree of the powdery materials. There can be included a plurality of feed ports Z361.

The first case Z31 has the open top and the powdery material passing member Z32 is disposed below the first case Z31. The first case Z31 according to the exemplary embodiment has the substantially funnel shape, while the first case Z31 is not limited to this shape but can have any shape if it is configured to feed the powdery material passing member Z32 with a powdery material.

The agitation shaft Z33 is disposed in the center of the first case Z31 in a planar view and is driven to rotate (i.e., spin) by the motor Z37. The agitating rotor Z34 is attached to each of the top and the center in the axial direction of the agitation shaft Z33, and the auxiliary rotor Z35 is attached to the lower end in the axial direction of the agitation shaft Z33. Rotation of the agitation shaft Z33 rotates the agitating rotors Z34 and the auxiliary rotor Z35.

Figure 8:
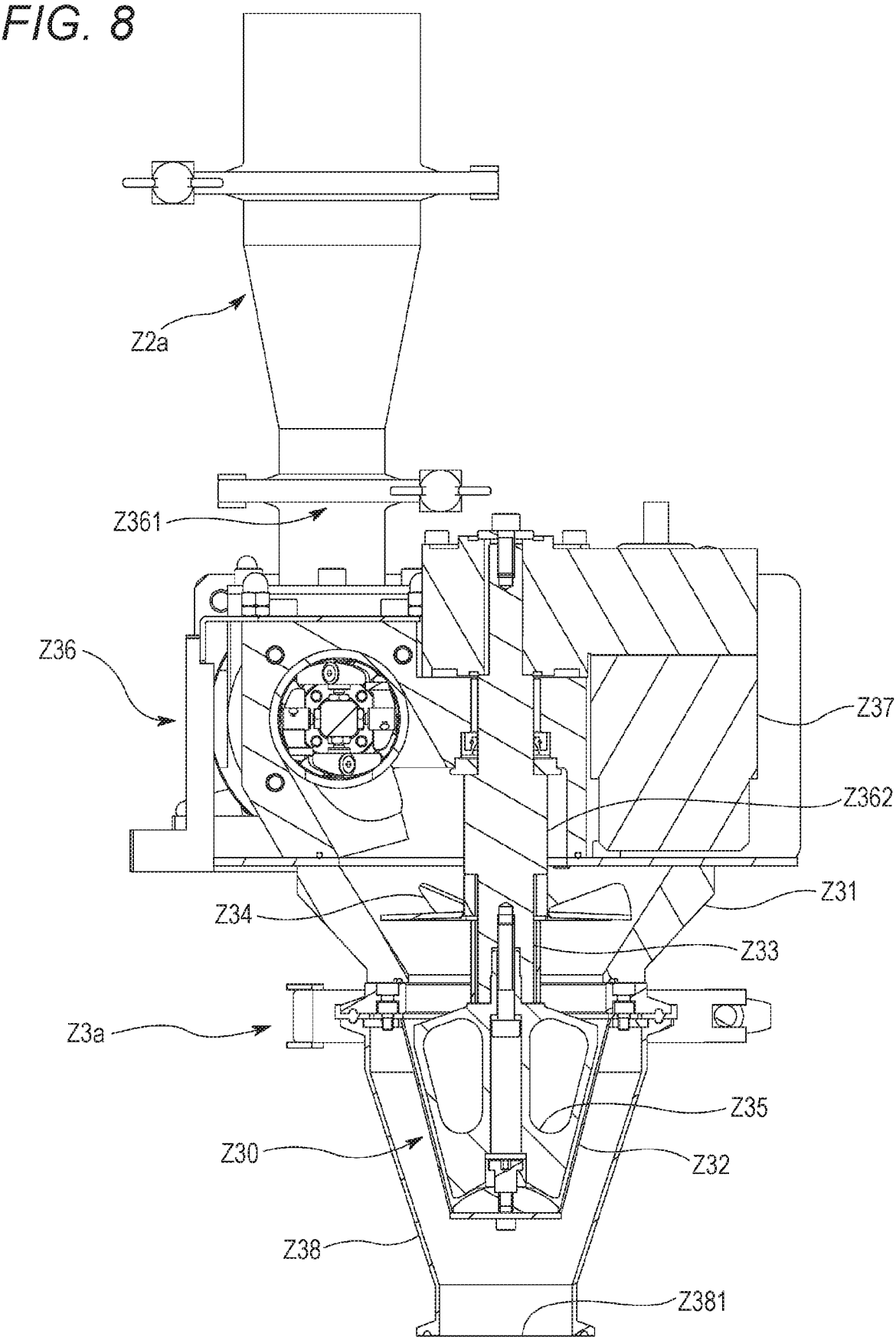
FIG. 8 is a side sectional view of another exemplary vertical mixer.

The agitating rotors Z34 (i.e., first mixing members) agitate and mix the powdery materials fed from the feed port Z361 into the first case Z31. The agitating rotors Z34 can have any shape. The agitating rotors Z34 shown in FIGS. 5 and 6 have a rectangular distal end and are disposed at two positions on the agitation shaft Z33. The vertical mixer Z3a shown exemplarily in FIG. 8 is configured partially differently from the vertical mixer Z3a shown exemplarily in FIGS. 5 and 6. The vertical mixer Z3a shown exemplarily in FIG. 8 includes the agitating rotor Z34 disposed at a single position on the agitation shaft Z33 and shaped differently from the agitating rotors Z34 shown exemplarily in FIGS. 5 and 6. The agitating rotors Z34 are not limited in terms of their shapes or positions to those shown in FIGS. 5, 6, and 8.

Figure 7:
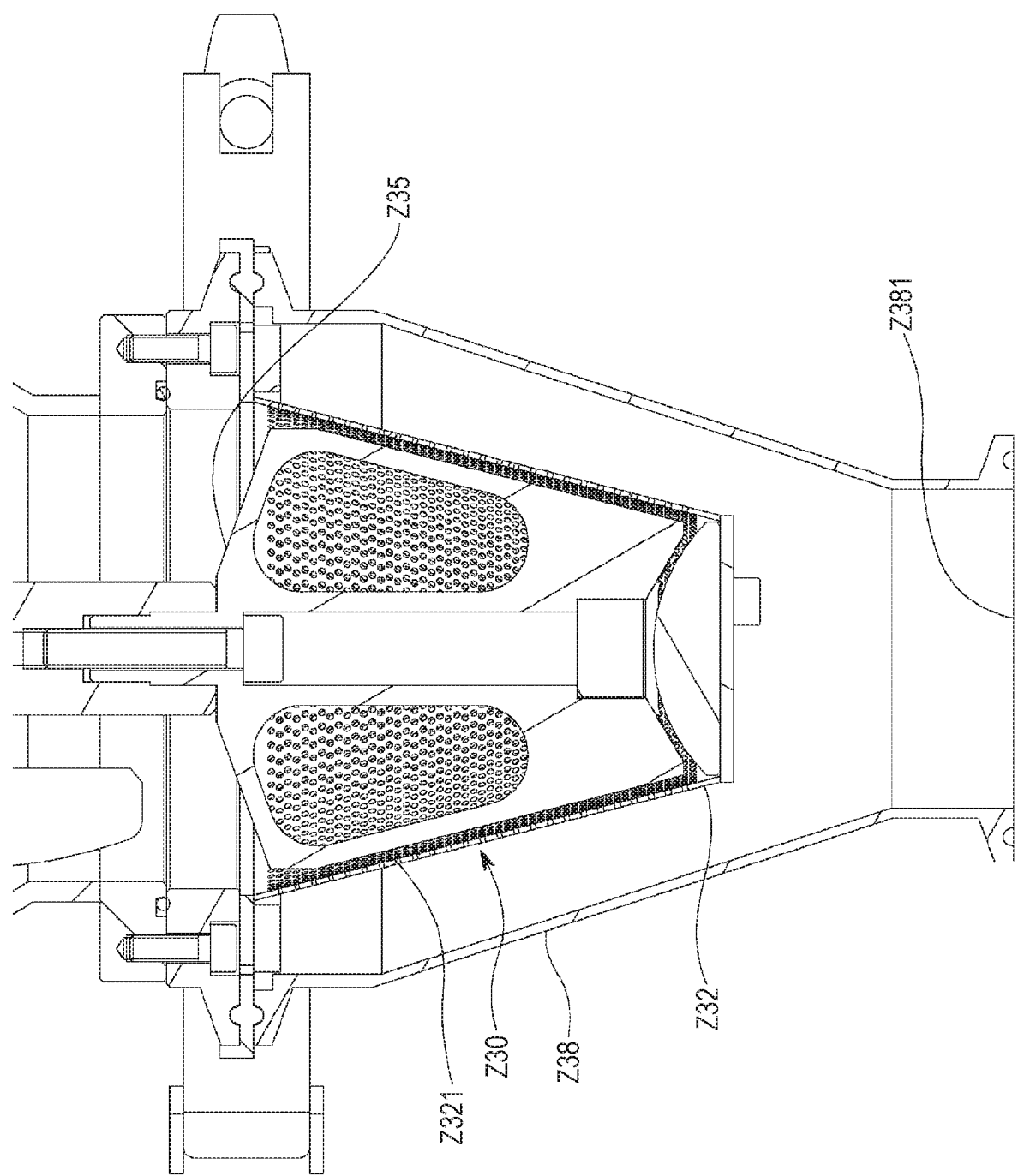
FIG. 7 is an enlarged side sectional view of a main part of the vertical mixer according to the exemplary embodiment.

As shown exemplarily in FIG. 7, the powdery material passing member Z32 at the reservoir Z30 is disposed below the first case Z31 and includes the plurality of bores Z321. The powdery material passing member Z32 is covered with the second case Z38. A powdery material passing through the bores Z321 of the powdery material passing member Z32 is discharged from a discharge port Z381 disposed at the bottom of the second case Z38. The number and the diameter of the bores Z321 are set appropriately. Such a configuration allows powdery materials to remain at the powdery material passing member Z32 and achieves improvement in mixing degree of the powdery materials. A powdery material passing through the bores Z321 of the powdery material passing member Z32 in a first vertical mixer Z3a a is fed to the horizontal mixer Z4 by way of the second connecting pipe Z2b.

The auxiliary rotor Z35 agitates a powdery material in the reservoir Z30. The auxiliary rotor Z35 is disposed in the center of the reservoir Z30 in a planar view and is attached to the lower end of the agitation shaft Z33. The auxiliary rotor Z35 according to the exemplary embodiment is shaped to follow the inner shape of the powdery material passing member Z32 and facilitates a powdery material to pass through the bores Z321. The auxiliary rotor Z35 is also configured as a type of an agitating rotor.

The vertical mixer Z3a according to the exemplary embodiment includes the agitating rotor Z34. The vertical mixer Z3a can alternatively be configured by the second case Z38, the powdery-material passing member Z32, and the auxiliary rotor Z35. The second case Z38 covers the powdery material passing member Z32, has a substantially funnel shape, and has the discharge port Z381 at the bottom. The second case Z38 guides a powdery material passing through the bores Z321 of the powdery material passing member Z32 to the discharge port Z381.

The second connecting pipe Z2b connects the vertical mixer Z3a and the horizontal mixer Z4 to be described later. The second connecting pipe Z2b is connected to the bottom of the vertical mixer Z3a and the top of the horizontal mixer Z4, and feeds the horizontal mixer Z4 with the powdery materials passing through the discharge port Z381 of the vertical mixer Z3a.

As shown exemplarily in FIG. 5, the horizontal mixer Z4 functioning as the second mixer includes a cylindrical case Z41, an agitation shaft Z42 disposed substantially in the center of the case Z41 and configured to spin, a motor Z43 configured to rotate (i.e., spin) the agitation shaft Z42, and an agitating rotor Z44 attached to the agitation shaft Z42 and configured to rotate to move a powdery material substantially horizontally. The horizontal mixer Z4 mixes the fed powdery materials, namely, the principal agent and the excipient or the like with the lubricant (i.e., second mixing). The case Z41 according to the exemplary embodiment does not rotate (i.e., spin), but can alternatively be configured to rotate. This will achieve further improvement in mixing degree of the powdery materials.

The case Z41 has a top including a plurality of feed ports that allows powdery materials to be fed into the case Z41, and a discharge port Z413 that allows mixed-powdery materials to be discharged from the case Z41. The configuration according to the exemplary embodiment includes two feed ports (e.g., first and second feed ports Z411 and Z412), and the second connecting pipe Z2b is connected to the first feed port Z411 of the case Z41 of the horizontal mixer Z4. The first feed port Z411 feeds the case Z41 with the mixed-powdery materials of the principal agent and the excipient or the like. The agitating rotor Z44 rotates to move the mixed-powdery materials fed into the case Z41 toward the discharge port Z413 of the case Z41. The second feed port Z412 feeds the lubricant from the third connecting pipe Z2c. The agitation shaft Z42 and the agitating rotor Z44 rotate to move the lubricant fed into the case Z41 toward the discharge port Z413 of the case Z41. Any of the feed ports not in use will be closed by a lid.

The discharge port Z413 is disposed at the bottom of the case Z41. The discharge port Z413 is connected with the fourth connecting pipe Z2d to be described later. The agitating rotor Z44 rotates to discharge the mixed-powdery materials from the case Z41 through the discharge port Z413 to the fourth connecting pipe Z2d.

Figure 9:
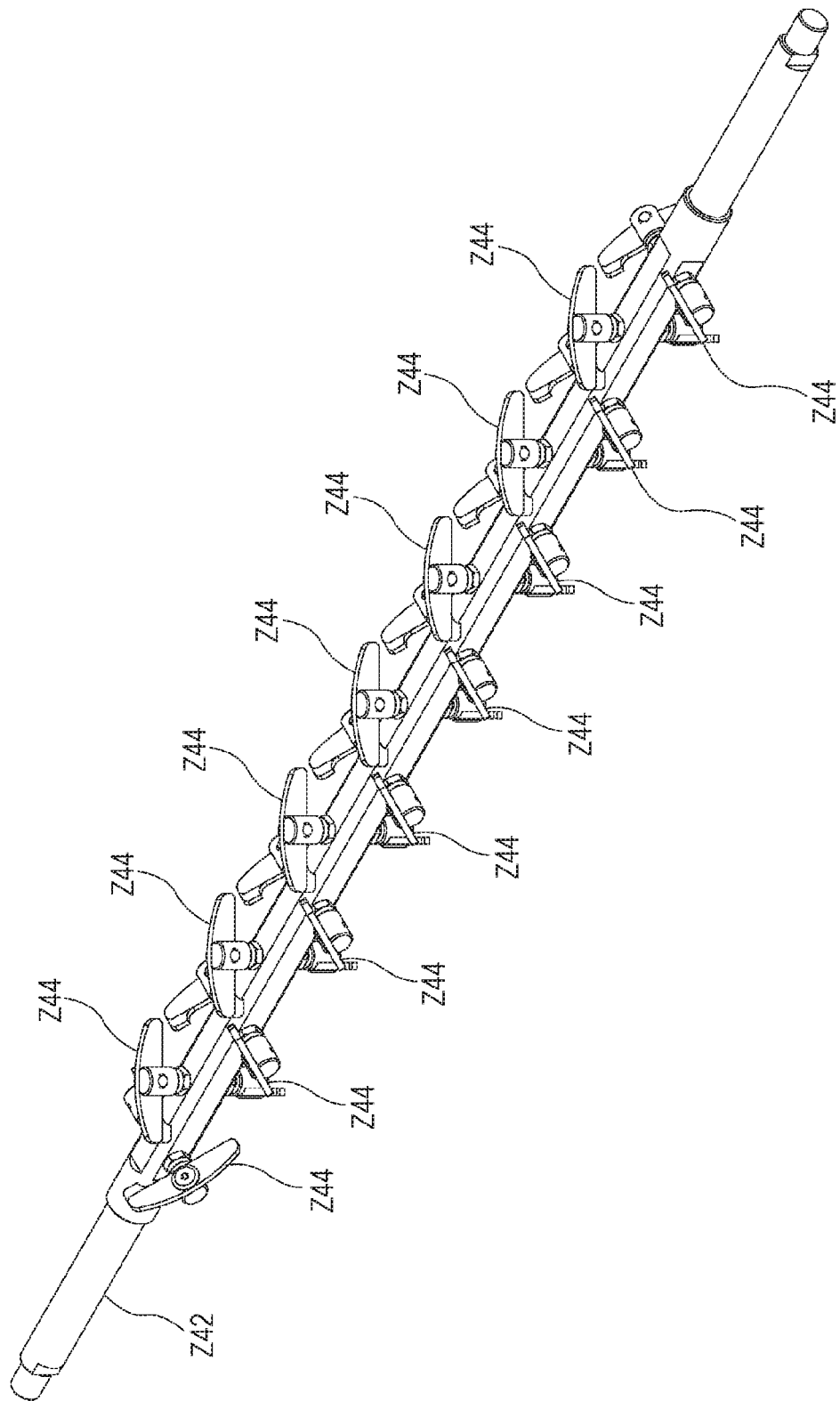
FIG. 9 is a perspective view of an agitation shaft and an agitating rotor (e.g., second mixing member) of a horizontal mixer included in the powdery-material feeding device according to the exemplary embodiment.

The agitation shaft Z42 extends in a longitudinal direction of the case Z41 and is disposed substantially in the center in a sectional view. The agitation shaft Z42 is driven to rotate (i.e., spin) by the motor Z43. As shown exemplarily in FIG. 9, the agitating rotor Z44 is attached to the agitation shaft Z42. Rotation of the agitation shaft Z42 causes rotation of the agitating rotor Z44 to simultaneously mix and move the powdery materials toward the discharge port Z413.

The agitating rotor Z44 is configured to agitate and mix the powdery materials fed into the case Z41 through the feed ports (e.g., Z411 and Z412). The agitating rotor Z44 can have any shape, but is preferably configured to simultaneously mix and move the powdery materials toward the discharge port Z413. As shown exemplarily in FIG. 9, the agitating rotor Z44 according to the exemplary embodiment is shaped to have both expanded ends, and is attached to the agitation shaft Z42 at a freely adjustable angle.

The third measuring feeder Z1c is configured to measure and feed a lubricant to the horizontal mixer Z4. The third connecting pipe Z2c is connected to the bottom of the third measuring feeder Z1c. The lubricant in the third measuring feeder Z1c is fed to the horizontal mixer Z4 through the third connecting pipe Z2c (i.e., lubricant feeding). The lubricant can alternatively be fed to the horizontal mixer Z4 by a μR feeder. The lubricant can still alternatively be fed to the horizontal mixer Z4 by an atomizer or a spray device.

The third connecting pipe Z2c includes a branch pipe Z2c1 and a main pipe Z2c2. The branch pipe Z2c1 has a first end connected to the bottom of the third measuring feeder Z1c, and a second end connected to the main pipe Z2c2. The lower end of the main pipe Z2c2 is connected to the second feed port Z412 of the horizontal mixer Z4.

The fourth connecting pipe Z2d has an upper end connected with the discharge port Z413 of the horizontal mixer Z4 and a lower end connected with the feed port Z361 of the buffer tank Z3b. The mixed-powdery materials are fed through the discharge port Z413 of the horizontal mixer Z4 and the fourth connecting pipe Z2d to the buffer tank Z3b.

The buffer tank Z3b has a bottom connected to the molding machine. The mixed-powdery materials passing through the buffer tank Z3b are fed to the feeder X in the molding machine and are eventually compression-molded in the die bores 4. The buffer tank Z3b may simply serve as a powdery-material reservoir tank directly connected to the feeder X in the molding machine via the feed pipe 191, or may also have a function as a mixer configured to mix a powdery material in the buffer tank Z3b. For example, assume that the buffer tank Z3b is configured similarly to the vertical mixer Z3a, in which case the powdery materials, namely, the principal agent, the excipient or the like, and the lubricant, to be fed to the feeder X in the molding machine, are further agitated to be mixed in the buffer tank Z3b (third mixing).

The powdery-material mixing degree measurement device M measures the mixing degree of the mixed-powdery materials discharged from the buffer tank Z3b in the powdery-material feeding device Z toward the molding machine. If the mixing degree is out of a predetermined range, then the mixed-powdery materials are discharged, alarm sound is issued, the device is stopped, or the like. The powdery-material mixing degree measurement device M promptly measures the mixing degree of the powdery materials mixed by the powdery-material feeding device Z and operates appropriately.

Examples of a method of measuring a mixing degree of mixed-powdery materials include Raman spectroscopy, infrared spectroscopy, X-ray diffraction, X-ray transmission measurement, and high performance liquid chromatography (HPLC). Any one of these methods is applicable to promptly measure a mixing degree of mixed-powdery materials. The exemplary embodiment mainly adopts near infrared reflectance (NIR), or a near infrared absorption spectrum method. Specifically, in order to evaluate an amount or a percentage (i.e., ratio) of the principal agent in the mixed-powdery materials (i.e., uniformity of the mixed-powdery materials) (whether or not the mixed-powdery materials are segregated), the mixed-powdery materials moving from the powdery-material feeding device Z toward the feeder X of the compression-molding machine are irradiated with near infrared light to measure light absorption and scattering for qualitative and quantitative analyses of a concentration and the like of the principal agent based on a spectrum. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials.

The exemplary embodiment adopts a near infrared sensor as a process analytical technology (PAT) sensor configured to measure a mixing degree and the like of powdery materials. As shown exemplarily in FIGS. 10 and 11, the configuration according to the exemplary embodiment includes a first sensor 51 of a near infrared sensor configured to initially measure the mixing degree of the mixed-powdery materials before being reserved in the buffer tank Z3b.

The powdery materials mixed by the powdery-material feeding device Z are temporarily reserved in the buffer tank Z3b as a reservoir after the first sensor S1 measures the mixing degree of the powdery materials. The powdery materials reserved in the buffer tank Z3b are fed to the powdery-material mixing degree measurement device M after a near infrared sensor S2 measures the mixing degree of the powdery-materials again. As already described, the mixed-powdery materials can optionally be further agitated and mixed in the buffer tank Z3b.

Figure 12:
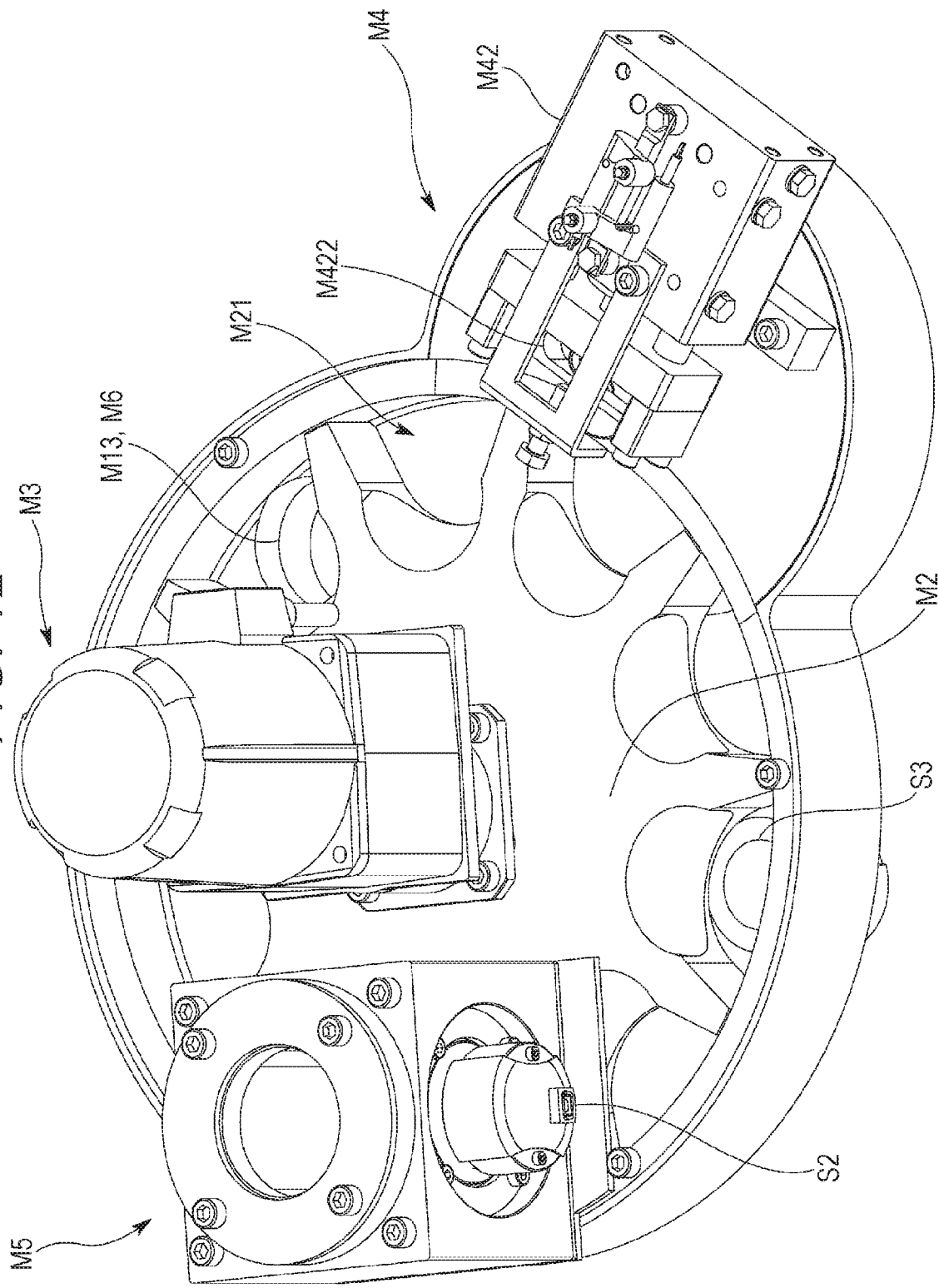
FIG. 12 is a perspective view of a main part of a powdery-material mixing degree measurement device according to the exemplary embodiment.
Figure 13:
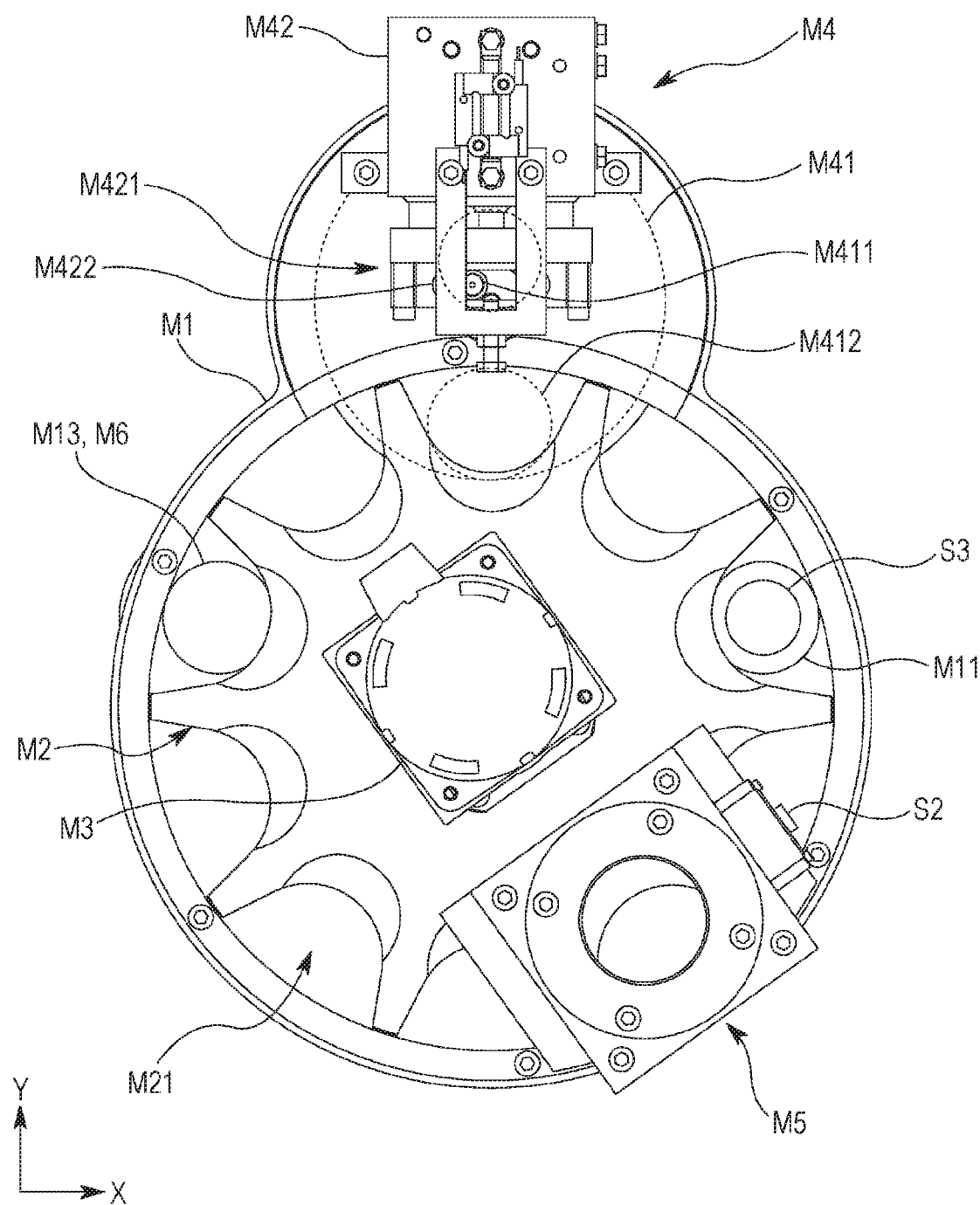
FIG. 13 is a plan view of the main part of the powdery-material mixing degree measurement device according to the exemplary embodiment.

As shown exemplarily in FIGS. 12 and 13, the powdery-material mixing degree measurement device M includes a case M1, a rotator M2 as a movable member in the case M1, a motor M3 as a driver for the rotator M2, near infrared sensors S2 and S3 configured to measure a mixing degree of powdery materials, a powdery-material remover M4 configured to remove defective mixed-powdery materials, the feeding unit M5 configured to introduce the mixed-powdery materials from the buffer tank Z3b into the case M1, and the discharger M6 configured to discharge the mixed-powdery materials to the agitated feeder X functioning as a filling device of the molding machine.

Figure 14:
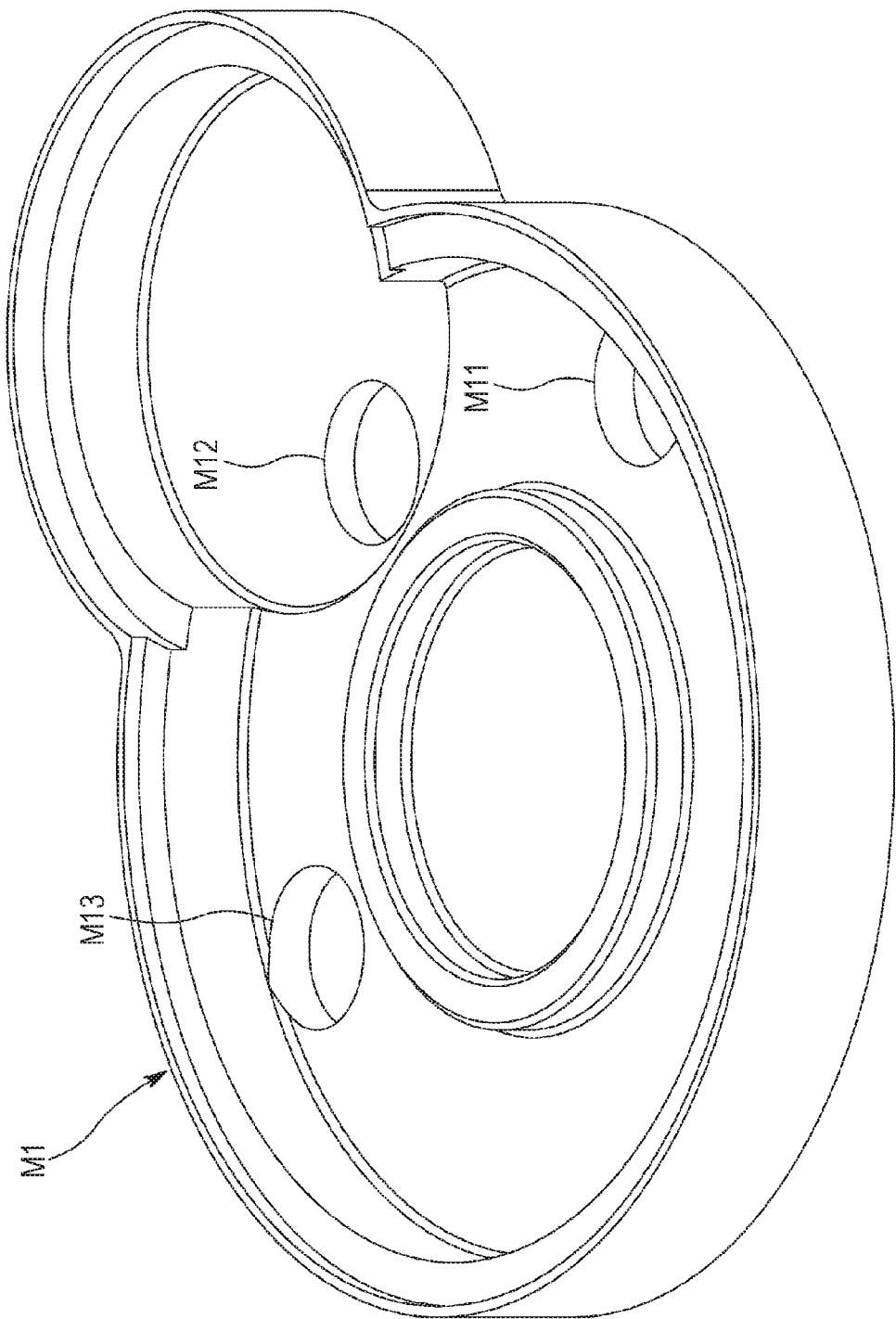
FIG. 14 is a perspective view of a case of the powdery-material mixing degree measurement device according to the exemplary embodiment.
Figure 15:
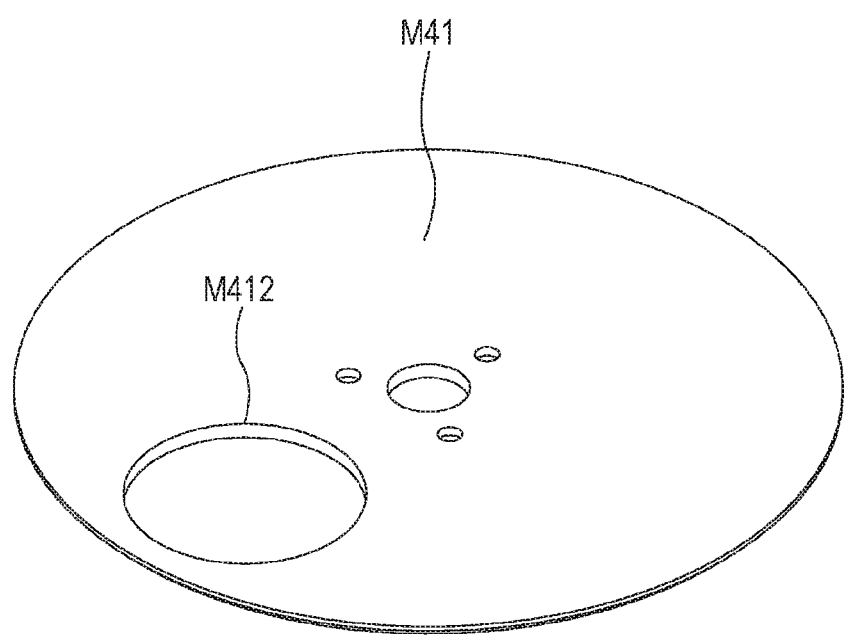
FIG. 15 is a perspective view of a drive body of the powdery-material mixing degree measurement device according to the exemplary embodiment.

As shown exemplarily in FIG. 14, the case M1 has a bottom surface including an attachment bore M11 allowing the near infrared sensor S3 to be mounted therein, a removal bore M12 (e.g., the powdery-material remover M4) for removal of a powdery material, and a discharge bore M13 (e.g., the discharger M6) for discharge of a powdery material to the powdery material feed pipe 191. The case M1 has a top surface on which the feeding unit M5 configured to feed the case M1 with a powdery material is mounted. The mixed-powdery materials enter the case M1 by way of the buffer tank Z3b and the feeding unit M5. The feeding unit M5 has the second sensor S2 of a near infrared sensor configured to measure a mixing degree of mixed-powdery materials passing through the feeding unit M5.

The rotator M2 includes a plurality of movable portions M21. The feeding unit M5 feeds the movable portions M21 with the mixed-powdery materials. The rotator M2 is driven to rotate by the motor M3 positioned above the rotator M2.

The third sensor S3 of a near infrared sensor is attached to the attachment bore M11 of the case M1 and is configured to measure a mixing degree of powdery materials fed to the movable portions M21.

The powdery-material remover M4 includes a case, a drive body M41, and a driver M42 configured to drive the drive body M41. The case of the powdery-material remover M4 is provided integrally with the case M1. The drive body M41 according to the exemplary embodiment has a circular disc shape, and includes a center projection M411 engaged with the driver M42, and a partial cutoff portion M412. The driver M42 has a distal end M421 configured to drive forward and backward along a Y axis indicated in FIG. 13, and an engagement bore M422 disposed at the distal end and engaged with the projection M411 of the drive body M41.

In a state where the distal end M421 of the driver M42 moves in a positive direction along the Y axis as indicated in FIG. 13, the cutoff portion M412 of the drive body M41 is located in the center of the removal bore M12 of the case M1. In another state where the distal end M421 moves in a negative direction along the Y axis, the cutoff portion M412 is apart from the removal bore M12 of the case M1.

Specifically, in the case where the driver M42 drives to move the distal end M421 in the negative direction along the Y axis, the drive body M41 is driven clockwise together therewith and the cutoff portion M412 is not overlapped with the removal bore M12. A powdery material in the movable portions M21 of the rotator M2 is not removed in this case. In the other case where the driver M42 drives to move the distal end M421 in the positive direction along the Y axis, the drive body M41 is driven counterclockwise together therewith and the cutoff portion M412 is overlapped with the removal bore M12. The powdery material in the movable portions M21 of the rotator M2 is removed in this case.

The drive body M41 according to the exemplary embodiment is driven clockwise and counterclockwise to remove the powdery material in the movable portions M21 of the rotator M2. The drive body M41 can alternatively be configured to rotate only in one direction to remove the powdery material in the movable portions M21.

If the mixing degree of the powdery materials measured with any of the first to third sensors S1 to S3 (i.e., the amount or the percentage (i.e., ratio) of the principal agent in the mixed-powdery materials, is out of the predetermined range), then the powdery-material remover M4 removes the mixed-powdery materials in the movable portions M21. The mixed-powdery materials in the movable portions M21 can alternatively be removed if all mixing degree measurement values of the first to third sensors S1 to S3 are out of the predetermined range, or if the measurement value of any one of the sensors S is out of the predetermined range.

The powdery-material remover M4 is also configured to sample the mixed-powdery materials.

The mixed-powdery materials not removed by the powdery-material remover M4 pass through the discharge bore M13 to reach the powdery-material feed pipe 191. The mixed-powdery materials move to the discharger M6 in this case.

A fourth sensor S4 of a near infrared sensor measures the mixing degree of the mixed-powdery materials reached the powdery-material feed pipe 191 before the mixed-powdery materials are guided into the agitated feeder X functioning as a filling device of the molding machine. Furthermore, a fifth sensor S5 of a near infrared sensor measures the mixing degree of the mixed-powdery materials in the agitated feeder X in the molding machine according to the exemplary embodiment.

If the mixing degree of the mixed-powdery materials measured by the fourth sensor S4 and/or the fifth sensor S5 is out of the predetermined range, then the mixed-powdery materials in the feeder X are once filled in each of the die bores 4 of the table 31 of the compression-molding machine and are compression-molded by the upper and lower punches 5 and 6 into the shape of a molded product. The molded product is then removed by the molded-product removal mechanism W before reaching the molded product collecting position 18. Specifically, in the molding machine, the control valve 22 is opened when the die bore 4 filled with defective mixed-powdery materials tableted into a molded product passes by the air spray nozzle 16a, and the air spray nozzle 16a sprays air to blow the molded product out of the table 31.

In summary, the powdery-material remover M4 removes the mixed-powdery materials if any of the first to third sensors S1 to S3 detects a mixing degree of the mixed-powdery materials out of the predetermined range, and the molded product removal mechanism W removes the compression-molded mixed-powdery materials if the fourth sensor S4 and/or the fifth sensor S5 detects a mixing degree of the mixed-powdery materials out of the predetermined range.

The molded product removal mechanism W removes a molded-product compression-molded in any of the die bores 4 also in a case where any of the load cells 25 mounted to the molding machine detects that compression pressure applied to the powdery material compressed in the die bore 4 is out of a predetermined range.

Summarized again below is a flow of continuous production of compression-molded products by the system according to the exemplary embodiment. Initially, the first measuring feeder Z1a simultaneously measures and feeds the principal agent, and the second measuring feeder Z1b simultaneously measures and feeds the excipient or the like (measuring and feeding). The vertical mixer Z3a functioning as the first mixer is subsequently fed with the powdery materials of the principal agent and the excipient or the like and mixes the powdery materials therein (i.e., first mixing). In the vertical mixer Z3a, the agitating rotor Z34 rotates about the agitation shaft Z33 disposed substantially vertically, to mix the powdery materials of the principal agent and the excipient or the like.

The horizontal mixer Z4 functioning as the second mixer is fed with the mixed-powdery materials of the principal agent and the excipient or the like subjected to the first mixing and mixes the powdery materials again (i.e., second mixing). In the horizontal mixer Z4, the agitating rotor Z44 rotates about the agitation shaft Z42 disposed substantially horizontally, to mix the powdery materials of the principal agent and the excipient or the like. Such a process achieves improvement in mixing degree of the at least two types of powdery materials (e.g., the principal agent and the excipient or the like), and causes less segregation of the principal agent. As already described, the powdery materials can optionally be fed to another vertical mixer Z3b so as to be mixed after the second mixing by the horizontal mixer Z4 (i.e., third mixing). This will achieve further improvement in mixing degree of the powdery materials.

The first mixing preferably includes reserving at least part of the powdery materials. Specifically, the powdery materials pass through the plurality of bores Z321 of the powdery material passing member Z32. The reservoir Z30 reserves powdery materials by increase in amount of the powdery materials to be fed to the first vertical mixer Z3aa to be more than the powdery materials passing through the bores Z321 or increase in a rotational speed of the auxiliary rotor Z35. The powdery materials then pass through the bores Z321 while being agitated and mixed by the auxiliary rotor Z35.

Furthermore, the third measuring feeder Z1c simultaneously measures and feeds the lubricant (i.e., lubricant feeding). The lubricant is fed to the horizontal mixer Z4 in the exemplary embodiment, but can alternatively be fed to a second vertical mixer Z3ab, the feeder X, or the like, with no limitation in feeding destination of the lubricant to the horizontal mixer Z4.

The mixed-powdery materials obtained by mixing the principal agent, the excipient or the like, and the lubricant are fed to the buffer tank Z3b connected to the molding machine. The sensor S2 or S3 then measures the mixing degree of the mixed-powdery materials fed to the buffer tank Z3b (i.e., measuring). The sensor S1 can obviously measure the mixing degree of the mixed-powdery materials before the mixed-powdery materials are fed to the buffer tank Z3b.

The mixed-powdery materials are removed if the measured mixing degree of the mixed-powdery materials is out of the predetermined range (e.g., removing). The mixed-powdery materials are subsequently fed to the feeder X functioning as a filling device. The sensor S5 can measure the mixing degree of the mixed-powdery materials in the feeder X, or the sensor S4 can measure the mixing degree of the mixed-powdery materials immediately before the mixed-powdery materials are fed to the feeder X.

The mixed-powdery materials fed to the feeder X are filled in the die bore 4 of the table 31 of the turret 3 in the molding machine (i.e., filling). As already described, prior to the filling with the powdery materials, the lubricant can optionally be sprayed to the inner circumferential surface of the die bore 4, the upper end surface of the lower punch 6, and the lower end surface of the upper punch 5 (i.e., external lubricant spraying). The mixed-powdery materials filled in each of the die bores 4 are compression-molded by the upper and lower punches 5 and 6 (i.e., compression molding). The mixed-powdery materials thus compression-molded into a molded product are guided by the guide member 17 and are collected at the molded-product collecting position 18. The controller C in the system causes the fourth sensor S4 and/or the fifth sensor S5 to repeatedly measure the mixing degree of the mixed-powdery materials fed by the powdery-material feeding device Z to the feeder X and filled in the die bores 4. If the measured mixing degree of the mixed-powdery materials is out of the predetermined range, then the molded product removal mechanism W in the molding machine removes a defective molded-product compression-molded in the die bore 4 filled with the mixed-powdery materials (i.e., molded product removing).

The controller C further causes the load cells 25 to measure a compression pressure applied from the punches 5 and 6 to the powdery material in each of the die bores 4 to obtain a molded product. The controller C causes the molded product removal mechanism W to remove a defective molded-product compression-molded in the die bore 4 having compression pressure out of the predetermined range (i.e., molded product removing). In a case where the powdery material filled in the die bore 4 is more than an appropriate amount, compression pressure measured by the load cell 25 exceeds the predetermined range. In another case where the powdery material filled in the die bore 4 is less than the appropriate amount, compression pressure measured by the load cell 25 is less than the predetermined range. In either one of the cases, the molded-product compression-molded in the die bore 4 has weight, density, and hardness different from desired values and is regarded as defective.

When the die bore 4 assumed to be filled with such defective mixed-powdery materials having a mixing degree out of the predetermined range or the die bore 4 receiving compression pressure out of the predetermined range (i.e., the possibly defective molded product), passes by the air spray nozzle 16a is found by referring to an output signal from the rotary encoder 23.

The first measuring feeder Z1a is configured to feedback control weight (i.e., a flow rate) of the fed principal agent per unit time, the second measuring feeder Z1b is configured to feedback control weight of the fed excipient or the like per unit time, and the third measuring feeder Z1c is configured to feedback control weight of the fed lubricant per unit time. Furthermore, these powdery materials are to be mixed at a desired mixture ratio. Even in this configuration, the amounts of the powdery materials discharged from the measuring feeders Z1 and fed to the mixers Z3a and Z4 can somehow deviate from initial target amounts. The powdery material fed from any of the measuring feeders Z1 to the mixer Z3a or Z4 is sometimes smaller than the target amount. In such a case, the amount of the principal agent in the mixed-powdery materials has a ratio larger or smaller than the desired ratio. A molded product obtained by compression molding such mixed-powdery materials is defective, failing to exert an expected drug effect.

Even if the mixer Z3a or Z4 fails to adequately mix the powdery materials and the mixed-powdery materials fed to the feeder X in the molding machine have segregation of the principal agent or the excipient, molded products will be defective with different contents.

In view of this, the controller C in the system adjusts, in accordance with the mixing degree measurement value of the mixed-powdery materials by any of the first to fifth sensors S1 to S5, the amounts of the powdery materials fed by the measuring feeders Z1a, Z1b, and Z1c, rotational speed of the agitation shaft Z33, the agitating rotor Z34, and the auxiliary rotor Z35 of the vertical mixer Z3a, rotational speed of the agitation shaft Z42 and the agitating rotor Z44 of the horizontal mixer Z4, and rotational speed of the agitation shaft, the agitating rotor, and the auxiliary rotor of the buffer tank Z3b functioning as a vertical mixer.

In a case where the absolute value of a difference between a target value and the amount or the percentage of the principal agent in the mixed-powdery materials repeatedly measured by any of the first to fifth sensors S1 to S5 is more than a predetermined threshold (i.e., the percentage of the principal agent is inappropriately small or large) continuously for at least a certain period, at least one of the first to third measuring feeders Z1a to Z1c is regarded as failing to feed an appropriate amount of the powdery materials. In this case, the controller C temporarily interrupts weight feedback control by the measuring feeder Z1 itself and adjusts rotational speed of a drive motor of each of the measuring feeders Z1 such that the amount or the percentage of the principal agent in the mixed-powdery materials measured by any of the first to fifth sensors S1 to S5 is approximate to the target value. In a case where the measured amount or the measured percentage of the principal agent in the mixed-powdery materials is less than the target value, the first measuring feeder Z1a increases the amount of the discharged principal agent, and/or the second measuring feeder Z1b decreases the amount of the discharged excipient or the like and the third measuring feeder Z1c decreases the amount of the discharged lubricant. In another case where the measured amount or the measured percentage of the principal agent in the mixed-powdery materials is more than the target value, the first measuring feeder Z1a decreases the amount of the discharged principal agent, and/or the second measuring feeder Z1b increases the amount of the discharged excipient or the like and the third measuring feeder Z1c increases the amount of the discharged lubricant.

Alternatively, if the absolute value of the difference between the target value and the amount or the percentage of the principal agent in the mixed-powdery materials is more than the threshold continuously for at least a certain period, then the target value of the discharged amount of the powdery materials commanded by the controller C to the measuring feeders Z1a to Z1c can be changed to optimize the amount of the fed principal agent. In a case where the measured amount or the measured percentage of the principal agent in the mixed-powdery materials is less than the target value, the first measuring feeder Z1a has a higher target value of the amount of the discharged principal agent, and/or the second measuring feeder Z1b has a lower target value of the amount of the discharged excipient or the like and the third measuring feeder Z1c has a lower target value of the amount of the discharged lubricant. In another case where the measured amount or the measured percentage of the principal agent in the mixed-powdery materials is more than the target value, the first measuring feeder Z1a has a lower target value of the amount of the discharged principal agent, and/or the second measuring feeder Z1b has a higher target value of the amount of the discharged excipient or the like and the third measuring feeder Z1c has a higher target value of the amount of the discharged lubricant.

In a case where the absolute value of the difference between the target value and the amount or the percentage of the principal agent in the mixed-powdery materials repeatedly measured by any of the first to fifth sensors S1 to S5 is more than the threshold not continuously for at least a certain period but is more than the threshold instantaneously or only for a short period, (the principal agent, the excipient or the like, or the lubricant of) the mixed-powdery materials moving toward the feeder X in the molding machine is regarded as having segregation (i.e., locally having portions of high and low concentrations of the principal agent). In this case, the controller C executes at least one of changing (i.e., increasing or decreasing) a current rotational speed of the agitation shaft Z33 and the agitating rotors Z34 and Z35 of the vertical mixer Z3a, changing (i.e., increasing or decreasing) a current rotational speed of the agitation shaft Z42 and the agitating rotor Z44 of the horizontal mixer Z4, and changing (i.e., increasing or decreasing) a current rotational speed of the agitation shaft and the agitating rotor of the buffer tank Z3b functioning as a vertical mixer. This achieves further improvement in mixing degree of the powdery materials.

Also in the case where the absolute value of the difference between the target value and the amount or the percentage of the principal agent in the mixed-powdery materials is more than the threshold continuously for at least the certain period, the controller C can control to change a current rotational speed of the agitating rotors Z34 and Z35 of the vertical mixer Z3a, to change a current rotational speed of the agitating rotor Z44 of the horizontal mixer Z4, and/or to change current rotational speed of the agitating rotor of the vertical mixer Z3b.

Compression molding a molded product with use of the molding machine can sometimes have serious tableting failures like binding, sticking, and capping to obtain a broken molded product. The molded-product can also have inadequate hardness.

High friction between the molded-product compressed in the die bore 4 and the inner circumference of the die bore 4 leads to an excessive pressure applied to the lower punch 6 that is pushing the molded product out of the die bore. This may cause a strong friction between the head 61 of the lower punch 6 and the push-up rail R4 as a cam rail to cause a crack, abrasion or damage of the head 61 of the lower punch 6 or the push-up rail R4.

In order to inhibit such defectiveness of the molded product or wear of the constituent member 6 or R4 of the molding machine, the controller C in the system adjusts by increasing or decreasing the amount of an internal lubricant preliminarily mixed with the powdery material to be filled in the die bore 4 (i.e., a ratio of the lubricant to the powdery material), and/or the amount of the external lubricant applied to the inner circumference of the die bore 4 and the tips 53 and 63, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material.

The internal lubricant is increased in amount by increasing the amount of the lubricant discharged from the third measuring feeder Z1c in the powdery-material feeding device Z, and/or by decreasing the amount of the principal agent discharged from the first measuring feeder Z1a, or the amount of the excipient or the like discharged from the second measuring feeder Z1b. In contrast, the internal lubricant is decreased in amount by decreasing the amount of the lubricant discharged from the third measuring feeder Z1c, and/or by increasing the amount of the principal agent discharged from the first measuring feeder Z1a, or the amount of the excipient or the like discharged from the second measuring feeder Z1b.

The external lubricant is increased in applied amount by increasing the flow rate of the lubricant sprayed from the spray nozzles Y1 and Y2 of the spray device Y in the molding machine, prolonging a time to spray the lubricant from the spray nozzles Y1 and Y2, or increasing a voltage applied to the static electricity generation electrode Y13 configured to charge the sprayed lubricant to increase an amount of electric charge. The external lubricant is decreased in applied amount by decreasing the flow rate of the lubricant sprayed from the spray nozzles Y1 and Y2 of the spray device Y, shortening time to spray the lubricant from the spray nozzles Y1 and Y2, or decreasing voltage applied to the static electricity generation electrode Y13 configured to charge the sprayed lubricant to decrease the amount of electric charge.

Specific examples of defectiveness of the molded product include binding of the powdery material, as a constituent material for the molded product, remaining on the inner circumferential surface of the die bore 4 to cause roughness or chipping at the outer circumferential surface of the molded product, sticking of the powdery material remaining at the lower end surface of the tip 53 of the upper punch 5 or the upper end surface of the tip 63 of the lower punch 6 to cause roughness or chipping at the upper surface or the lower surface of the molded product, capping to cause the compression-molded product to be broken, and inadequate hardness of the molded product. Binding and sticking can be inhibited by increasing the amount of the internal lubricant mixed with the powdery material, or increasing the amount of the external lubricant to be applied to the die bore 4 and the tips 53 and 63. In contrast, capping can be inhibited by decreasing the amount of the internal lubricant mixed with the powdery material. Hardness of the molded product can also be improved (i.e., enhanced) by decreasing the amount of the internal lubricant.

Upon detection of binding or sticking, the controller C increases the amount of the internal lubricant mixed with the powdery material to excess base quantity (i.e., fundamental quantity for production of the molded product, set in accordance with size, shape, weight, contents, and the like of the molded product), and/or increases the amount of the external lubricant applied to the die bore 4 and the tips 53 and 63 to excess base quantity. Whether the molded product has binding or sticking can be determined through an analysis of an image obtained by a camera sensor (i.e., image sensor) S7 configured to capture the compression-molded product, or a camera sensor S7 configured to capture the die bore 4 or the tip 53 or 63. Upon detection of binding or sticking, the controller C gradually increases the amount of the internal lubricant and/or the amount of the external lubricant until recurrence of binding or sticking is eliminated. Upon no more detection of binding or sticking, the controller C gradually decreases the amount of the internal lubricant and/or the amount of the external lubricant toward the base quantity thereof as long as recurrence is not observed.

When capping is detected or when hardness of the molded product is less than a threshold, the controller C decreases the amount of the internal lubricant mixed with the powdery material to become less than the base quantity. Whether or not the molded product has capping can be determined through an analysis of an image obtained by the camera sensor S7 configured to capture the compression-molded product. Hardness of the molded product can be found through measurement with use of a durometer or near infrared reflectance with use of a near infrared sensor S8. Whether or not hardness of the molded product reaches a desired threshold can be determined alternatively by sampling tableting sound generated instantaneously when the punches 5 and 6 compress the powdery material in the die bore 4 and executing a sound analysis. Upon detection of capping or that hardness of the molded product does not reach the desired threshold, the controller C gradually decreases the amount of the internal lubricant until recurrence of capping is eliminated. Upon no more detection of capping or inadequate hardness of the molded product, the controller C gradually increases the amount of the internal lubricant toward the base quantity thereof as long as recurrence is not observed. The controller C can alternatively execute feedback control of increasing or decreasing the amount of the internal lubricant to reduce a difference between hardness of the molded product and a target value.

Furthermore, in the case where capping is detected or hardness of the molded product is less than the threshold, in comparison to the contrary case, the controller C can decrease a rotational speed of the motor 8 of the molding machine as well as the turret 3 and the punches 5 and 6, and prolong time to apply pressure from the punches 5 and 6 to the powdery material in the die bore 4 (e.g., time to press the punches 5 and 6 by the rolls 12 to 15).

If determining that pressure applied to the lower punch 6 pushing the molded product out of the die bore 4 in the molding machine is large to be not less than a threshold, then the controller C increases the amount of the internal lubricant mixed with the powdery material to exceed the base quantity, and/or increases the amount of the external lubricant applied to the die bore 4 and the tips 53 and 63 to exceed the base quantity. Increase in amount of the lubricant will achieve a reduction in friction between the molded product and the inner circumferential surface of the die bore 4 and a decrease in pressure applied to the lower punch 6 pushing the molded product out of the die bore 4.

A level of pressure applied to the lower punch 6 pushing the molded product out of the die bore 4 (i.e., force acting between the head 61 of the lower punch 6 and the push-up rail R4) can be estimated through measurement with use of a displacement sensor S9 configured to detect deformation or displacement of the push-up rail R4 (a distance measurement sensor, exemplified by a contactless displacement sensor like a laser displacement sensor, an eddy current magnetic displacement sensor, or a ultrasonic displacement sensor, or a contact displacement sensor (that can be configured to measure a displacement amount according to temperature change)), a temperature sensor configured to detect heat caused by friction between the head 61 of the lower punch 6 and the push-up rail R4 (e.g., a thermocouple), a strain sensor configured to detect strain of the push-up rail R4 (e.g., a strain gauge), a shock sensor configured to detect impact on the push-up rail R4, or the like. Whether or not pressure applied to the lower punch 6 pushing the molded product out of the die bore 4 reaches a predetermined threshold can alternatively be determined by sampling noise generated instantaneously when the head 61 of the lower punch 6 slides along the push-up rail R4 and executing a noise analysis. When determining that pressure applied to the lower punch 6 pushing the molded product out of the die bore 4 is not less than the predetermined threshold, the controller C gradually increases the amount of the internal lubricant and/or the amount of the external lubricant until the pressure becomes less than the threshold. Upon determination that the pressure becomes less than the threshold, the controller C gradually decreases the amount of the internal lubricant and/or the amount of the external lubricant toward the base quantity thereof as long as the pressure again does not increase to become not less than the threshold. The controller C can alternatively execute a feedback control of increasing or decreasing the amount of the internal lubricant and/or the amount of the external lubricant to reduce a difference between a pressure applied to the lower punch 6 pushing the molded product out of the die bore 4 and a target value.

The controller C can still alternatively be configured to measure with use of a required sensor, temperature of the die bore 4, the upper punch 5, or the lower punch 6, temperature of the powdery material filled in the die bore 4, and/or humidity of the powdery material, and execute a feedforward control of increasing or decreasing the amount of the internal lubricant and/or the amount of the external lubricant from the base quantity if the temperature and/or the humidity is out of a predetermined range. The predetermined range for the temperature of the die bore 4, the temperature of the punch 5 or 6, the temperature of the powdery material, and/or the humidity of the powdery material is set to prevent or adequately inhibit defectiveness of the molded product or wear of the head 61 of the lower punch 6 or the push-up rail R4. If the temperature and/or the humidity falls within the predetermined range, then the amount of the internal lubricant and/or the amount of the external lubricant is basically adjusted to the base quantity. When the temperature and/or the humidity falls within the predetermined range, the amount of the internal lubricant and/or the amount of the external lubricant is increased from the base quantity under a condition with possible binding, sticking, wear of the head 61 of the lower punch 6 or the push-up rail R4, and the amount of the internal lubricant and/or the amount of the external lubricant is decreased from the base quantity under a condition with possible capping or inadequate hardness of the molded product.

The controller C included in a compression-molding processing system according to the exemplary embodiment controls the molding machine configured to fill the die bore 4 with a powdery material and to compress the powdery material with use of the upper and lower punches 5 and 6 to obtain a molded product, and/or the powdery-material feeding device Z configured to feed the molding machine with the powdery material, and the controller C is configured to adjust by increasing or decreasing an amount of a lubricant mixed with the powdery material, and/or an amount of a lubricant applied to the inner circumference of the die bore 4 and the tips 53 and 63, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material. The exemplary embodiment inhibits defectiveness of the molded product during production of the molded product with use of the molding machine and wear of the lower punch 6 and the cam rail R4 as the constituent members of the molding machine, to achieve continuous operation for a long period of time without stopping the molding machine and the powdery-material feeding device Z. The exemplary embodiment thus achieves further improvement in productivity of the molded products.

The exemplary embodiment described above includes adjusting by increasing or decreasing the amount of the lubricant in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material. Instead of, or along with this, time to mix the internal lubricant to be mixed with the powdery material (i.e., preliminarily before being fed to the molding machine) and the powdery material can alternatively be adjusted by prolonging or shortening, in accordance with whether or not the molded product has defectiveness, pressure applied to the lower punch 6 pushing the molded product out of the die bore 4, temperature of the die bore 4, the upper punch 5, or the lower punch 6, temperature of the powdery material, or humidity of the powdery material.

Inappropriately short time to mix the powdery material to be filled in the die bore 4 and the internal lubricant leads to deterioration in mixing degree of the powdery material and the lubricant, to increase possibility of future tableting failure like binding or sticking in the molding machine. Extremely long mixing time allows the lubricant to coat particles of the powdery material, to possibly affect quality of the molded product such as reduction in speed of elution of the principal agent (e.g., a main ingredient or an active ingredient) from the completed molded product.

Inhibition of binding or sticking or reduction in pressure applied to the lower punch 6 pushing the molded product out of the die bore 4 can effectively be achieved by prolonging time to mix the powdery material with the internal lubricant. The lubricant to be mixed with the powdery material and the powdery material are thus mixed together for longer time if binding or sticking occurs or pressure applied to the lower punch pushing the molded product out of the die bore increases to become not less than the threshold. Too long mixing time may cause quality defectiveness of the molded product, and the mixing time is thus preferably shortened as long as binding or sticking does not occur or pressure applied to the lower punch 6 pushing the molded product out of the die bore 4 does not increase, and as long as the molded product does not have segregation of contents.

When the internal lubricant is mixed with the powdery material with use of the horizontal mixer Z4 according to the exemplary embodiment, the powdery material is transferred while being agitated in the case Z41 in an extension direction of the case Z41 and the agitation rod Z42 and the lubricant is supplied or added to the powdery material. Time to mix the powdery material and the lubricant is prolonged or shortened in accordance with a position in the extension direction of the case Z41 and the agitation rod Z42, where the lubricant is supplied to the powdery material (i.e., a distance from the position where the lubricant is supplied to the discharge port Z413 of the horizontal mixer Z4). As shown exemplarily in FIG. 10, the horizontal mixer Z4 includes a plurality of feed ports Z412, Z412$x$, and Z412$y$ aligned in the extension direction of the case Z41 and the agitation rod Z42. Time to mix the powdery material and the lubricant is longer in a case where (the main pipe Z2$c$2 of) the third connecting pipe Z2$c$ is connected to the feed port Z412$y$ distant from the discharge port Z413, in comparison to a case where the third connecting pipe Z2$c$ is connected to the feed port Z412 closer to the discharge port Z413.

If a mixer configured to mix a powdery material and an internal lubricant can adjust mixing time with no manpower (e.g., the horizontal mixer Z4 includes a mechanism configured to change a position where the lubricant is supplied to the powdery material, or a mechanism configured to switch among the feed ports Z412, Z412$x$, and Z412$y$ to be connected with the third connecting pipe Z2$c$), then the controller C can automatically control to prolong the time to mix the powdery material and the lubricant from base time when binding or sticking is detected or when pressure applied to the lower punch 6 pushing the molded product out of the die bore 4 increases to become not less than the threshold in the molding machine. The controller C can control to gradually shorten the time to mix the powdery material with the lubricant to become close to the base time when no more binding or sticking is detected or when the pressure applied to the lower punch 6 pushing the molded product out of the die bore 4 decreases to become not more than the threshold. Length of the time to mix the powdery material and the lubricant may be feedback-controlled or feedforward-controlled.

In the compression-molding processing system according to the exemplary embodiment, the powdery-material feeding device Z continuously or intermittently feeds the feeder X with the powdery material while the molding machine configured to produce a molded product is in an operation, without stopping rotation of the table 31 and the punch retaining portions 32 and 33 of the turret 3, filling the die bores 4 with the powdery material by the feeder X, and compression molding the powdery material in the die bores 4 by the upper and lower punches 5 and 6.

Figure 22:
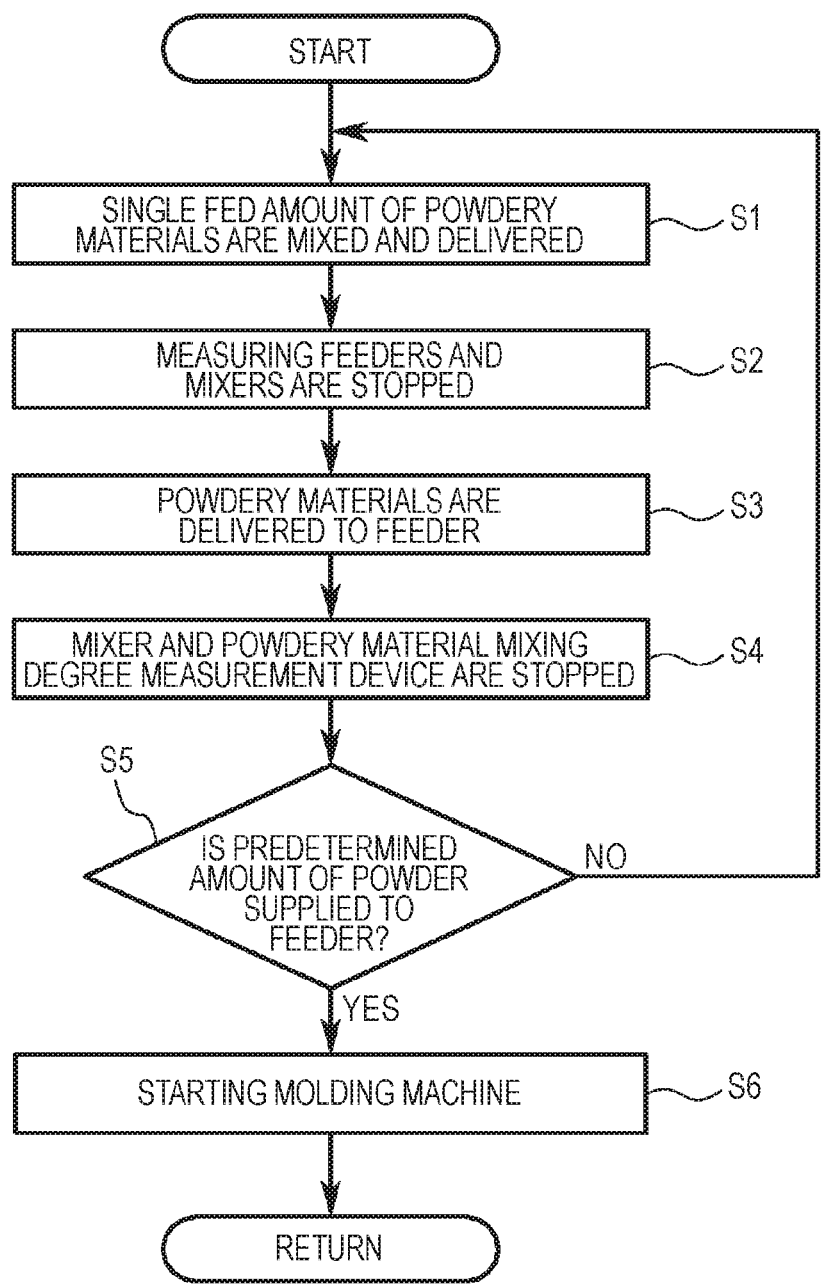
FIG. 22 is a flowchart showing an exemplary procedure of powdery material supply executed before starting the rotary compression-molding machine according to the exemplary embodiment.

When the powdery-material feeding device Z continuously or intermittently feeds the feeder X with the powdery material while the molding machine is in an operation, the measuring feeders Z1a, Z1b, and Z1c, and the mixers Z3a, Z4, and Z3b, as elements of the powdery-material feeding device Z, as well as the powdery-material mixing degree measurement device M, operate not constantly but intermittently, with temporary stop between a previous operation and a subsequent operation. The powdery-material feeding device Z has a flow of operation in this case similar or equal to the flow shown exemplarily in a flowchart in FIG. 22 excluding step S6 of starting the molding machine having been stopped. More specifically, a batch or an amount of the powdery material fed one time from the powdery-material feeding device Z to the feeder X is set to an appropriate amount according to a speed of the powdery material dealt by the molding machine. A plurality of types of powdery materials as constituent materials for a molded product is then discharged from the measuring feeders Z1a, Z1b, and Z1c, such that the powdery materials have required ratios (particularly, weight ratios of the powdery materials fed from the measuring feeders Z1a, Z1b, and Z1c per unit time (i.e., flow rates) are adjusted to have the required ratios), as well as such that the total of the powdery materials is equal to a single-fed amount. In addition, the mixers Z3a and Z4 are started to mix the powdery materials discharged from the measuring feeders Z1a, Z1b, and Z1c and simultaneously deliver the powdery materials to the mixer Z3b provided as the buffer tank (i.e., step S1). When the mixed-powdery materials reaches the buffer tank Z3b, the measuring feeders Z1a, Z1b, and Z1c and the mixers Z3a and Z4 are once stopped (i.e., step S2), the mixer Z3b and the powdery-material mixing degree measurement device M are started in the state, and the single-fed amount of the powdery materials are delivered to the feed pipe 191 and then to the feeder X (i.e., step S3). The mixer Z3b and the powdery-material mixing degree measurement device M are subsequently stopped (i.e., step S4), the measuring feeders Z1a, Z1b, and Z1c, and the mixers Z3a and Z4 are started again, and the single-fed amount of the powdery materials are discharged to be simultaneously mixed and delivered to the mixer Z3b (i.e., step S1). The measuring feeders Z1a, Z1b, and Z1c, and the mixers Z3a and Z4 are subsequently stopped again (i.e., step S2), the mixer Z3b and the powdery-material mixing degree measurement device M are restarted, and the single-fed amount of the powdery materials are delivered to the feed pipe 191 and then to the feeder X (i.e., step S3). The above procedure (i.e., step S1 to step S4) is repeated (i.e., step S5) to cause the powdery-material feeding device Z to intermittently feed the feeder X with the powdery materials.

The compression-molding processing system according to the exemplary embodiment can stably mass produce molded products having a desired quality under a condition where the molding machine has already been in the operation. The compression-molding system may, however, produce a molded product having defective quality during a period immediately after the stopped molding machine starts, specifically, immediately after starting a rotation of the table 31 and the punch retaining portions 32 and 33, filling the die bores 4 with the powdery materials by the feeder X, and compression molding the powdery materials in the die bores 4 by the upper and lower punches 5 and 6. For example, the molded product may not have required hardness or density, or may have segregation of contents, binding, sticking, or capping.

In view of this, the controller C according to the exemplary embodiment causes, upon the start of the molding machine being stopped, the powdery-material feeding device Z to supply the feeder X with a predetermined amount of the powdery materials while stopping the rotation of the table 31 and the punch retaining portions 32 and 33, filling the die bores 4 with the powdery materials by the feeder X, and compression molding the powdery materials in the die bores 4 by the upper and lower punches 5 and 6, and then starts the molding machine. Before the molding machine is started, the appropriately mixed-powdery materials are preliminarily fed in the feeder X to mostly or substantially entirely occupy volume of the feeder X, and are accumulated, if necessary, to reach a certain level in the feed pipe 191 positioned just above the feeder X. The molding machine is started in this state, to cause the rotation of the table 31 and the punch retaining portions 32 and 33, filling the die bores 4 with the powdery materials by the feeder X (including rotation of the agitating rotor incorporated in the agitated feeder X), and compression molding the powdery materials in the die bores 4 by the upper and lower punches 5 and 6. At least a certain amount of the mixed-powdery materials may be additionally accumulated in the powdery-material mixing degree measurement device M and/or the buffer tank Z3b positioned upstream of the feeder X. Such preparation leads to production of molded products secured to have required quality from the period immediately after the molding machine starts.

Assume that the powdery-material feeding device Z supplies the feeder X with the powdery materials having an amount from 500 cc to 2000 cc before the molding machine starts. The powdery-material feeding device Z may deliver the predetermined amount of the powdery materials to the feeder X in batches or at one time.

In the case where the powdery-material feeding device Z delivers the predetermined amount of the mixed-powdery materials in batches, the predetermined amount of the mixed-powdery materials to be supplied to the feeder X before the molding machine starts are divided into two to five portions. If the predetermined amount is from 500 cc to 2000 cc, then the batch or the amount of single portion is exemplarily set to a value from about 150 cc to 600 cc. As shown exemplarily in FIG. 22, the plurality of types of powdery materials as constituent materials for a molded product is then discharged from the measuring feeders Z1a, Z1b and Z1c such that the powdery materials have required ratios (particularly, weight ratios of the powdery materials fed from the measuring feeders Z1a, Z1b and Z1c per unit time (i.e., flow rates) are adjusted to have the required ratios), as well as such that the total of the powdery materials has the value from about 150 cc to 600 cc as the batch. In addition, the mixers Z3a and Z4 are started to mix the powdery materials discharged from the measuring feeders Z1a, Z1b and Z1c and simultaneously deliver the powdery materials to the mixer Z3b provided as the buffer tank (i.e., step S1). When the batch of the mixed-powdery materials reach the buffer tank Z3b, the measuring feeders Z1a, Z1b, and Z1c and the mixers Z3a and Z4 are once stopped (i.e., step S2), the mixer Z3b and the powdery-material mixing degree measurement device M are started in the state, and the batch of the powdery materials are delivered to the feed pipe 191 and then to the feeder X (i.e., step S3). The mixer Z3b and the powdery-material mixing degree measurement device M are subsequently stopped (i.e., step S4), the measuring feeders Z1a, Z1b, and Z1c, and the mixers Z3a and Z4 are started again, and the batch of the powdery materials are discharged to be simultaneously mixed and delivered to the mixer Z3b (i.e., step S1). The measuring feeders Z1a, Z1b, and Z1c and the mixers Z3a and Z4 are subsequently stopped again (i.e., step S2), the mixers Z3b and the powdery-material mixing degree measurement device M are restarted, and the batch of the powdery materials are delivered to the feed pipe 191 and then to the feeder X (i.e., step S3). The above procedure (i.e., step S1 to step S4) is repeated (i.e., step S5) a required number of times to supply the feed pipe 191 and the feeder X with the predetermined amount of the mixed-powdery materials.

Step S1 and step S2 are not limited to include simultaneously discharging about 150 cc to 600 cc in total of the powdery materials from the measuring feeders Z1a, Z1b, and Z1c, and simultaneously mixing and delivering the powdery materials collectively to the buffer tank Z3b. For example, the measuring feeder Z1c, the mixers Z3a, Z4, and Z3b, and the powdery-material mixing degree measurement device M are stopped, and the measuring feeders Z1a and Z1b are started to discharge the powdery materials to be included in the batch. The total amount of the powdery materials discharged one time from the measuring feeders Z1a and Z1b is equal to the amount obtained by subtracting the amount of the powdery material discharged one time from the measuring feeder Z1c from about 150 cc to 600 cc as the batch. The measuring feeders Z1a and Z1b are then stopped, and the mixer Z3a is started almost simultaneously to mix the powdery materials discharged from the measuring feeders Z1a and Z1b and joined at the mixer Z3a. Furthermore, the measuring feeder Z1c and the mixer Z4 are started, so that an additional powdery material is discharged from the measuring feeder Z1c and the batch of all the mixed-powdery materials is simultaneously delivered to the mixer Z3b serving as a buffer tank (i.e., step S1). The amount of the powdery material discharged one time from the measuring feeder Z1c is obviously equal to the amount obtained by subtracting, from about 150 cc to 600 cc, the amounts of the powdery materials discharged one time from the measuring feeders Z1a and Z1b. The measuring feeder Z1c as well as the mixers Z3a and Z4 are subsequently stopped (i.e., step S2), the mixer Z3b and the powdery-material mixing degree measurement device M are started, and the batch of the powdery materials are delivered to the feed pipe 191 and then to the feeder X (i.e., step S3). The mixer Z3b and the powdery-material mixing degree measurement device M are subsequently stopped (i.e., step S4), and the measuring feeders Z1a and Z1b are restarted. The above procedure (i.e., step S1 to step S4) is repeated (i.e., step S5) a required number of times to supply the feed pipe 191 and the feeder X with the predetermined amount of the mixed-powdery materials.

In order to deliver the predetermined amount of the powdery materials at one time from the powdery-material feeding device Z to the feeder X, the plurality of types of powdery materials as constituent materials for a molded product is discharged from the measuring feeders Z1a, Z1b, and Z1c reserving the powdery materials such that the powdery materials have the required ratios and the total of the powdery materials is equal to the predetermined amount. The mixers Z3a, Z4, and Z3b and the powdery-material mixing degree measurement device M are also started to simultaneously mix and deliver the predetermined amount of the powdery materials discharged from the measuring feeders Z1a, Z1b, and Z1c to the feed pipe 191 and then to the feeder X.

When the powdery-material feeding device Z supplies the feeder X with the powdery materials while the molding machine is stopped, the agitating rotor incorporated in the agitated feeder X may be kept stopped or may keep rotating. The agitating rotor is rotated not in order to actively fill the die bores 4 of the table 31 being stopped with the powdery materials but in order to fill the powdery materials in the feeder X as evenly as possible. In the case where the agitating rotor rotates while the molding machine is stopped, the agitating rotor may have a rotational speed lower than the rotational speed for sequentially filling, with the powdery materials, the die bores 4 of the rotating table 31 in the molding machine in the operation, or the agitating rotor may be rotated only by a rotation angle or a number of times smaller than the rotation angle or the number of times for the molding machine in the operation. The feeder X embodied as a gravity feeder does not include any agitating rotor.

The molding machine being stopped is started when the mixed-powdery materials are accumulated to a required level in the powdery material feed pipe 191 directly connected to the feeder X. As shown exemplarily in FIGS. 10 and 11, the feed pipe 191 preliminarily has a sensor S6 configured to detect the upper surface level of the mixed-powdery materials in the feed pipe 191. The sensor S6 is configured as a capacitance level switch or the like. The level switch S6 is configured to detect whether the upper surface level of a powdery material in the feed pipe 191 is higher or lower than the level switch S6. The controller C determines whether or not the mixed-powdery materials are accumulated to reach the required level in the feed pipe 191 with use of the level switch S6, for determination of whether or not to start the molding machine. After the molding machine is started to produce a molded product (i.e., step S6), the powdery-material feeding device Z ordinarily feeds the feeder X with the mixed-powdery materials continuously or intermittently.

Each of the feeders Z1a, Z1b, and Z1c included in the powdery-material feeding device Z is requested to execute, before its use, tuning of measuring a relation between expected control input (or a manipulated variable) to the motor Z122 configured to drive the transfer member Z121 (i.e., a rotational speed or an output torque of the motor Z122 (current and/or voltage applied to the coil of the motor Z122)), and control output (or a controlled variable) of the corresponding feeder Z1a, Z1b, or Z1c (i.e., a flow rate of the powdery material discharged from the corresponding feeder Z1a, Z1b, or Z1c when the motor Z122 drives the transfer member Z121).

As described above, in the exemplary embodiment, the predetermined amount of the powdery material is preliminarily discharged from each of the feeders Z1a, Z1b, and Z1c in the powdery-material feeding device Z and is supplied to the feed pipe 191 and the feeder X in the molding machine being stopped before the molding machine starts. The feeders Z1a, Z1b, and Z1c are tuned at this timing Tuning includes commanding predetermined control input (i.e., a predetermined rotational speed or an output torque of the motor), to the motor Z122 in each of the feeders Z1a, Z1b, and Z1c, and measuring control output thus obtained (i.e., the amount of the powdery material discharged from the corresponding feeder Z1a, Z1b, or Z1c). The powdery materials discharged from the feeders Z1a, Z1b, and Z1c upon tuning can be used as the batch of the powdery materials to be supplied to the feed pipe 191 and the feeder X before the molding machine starts.

Figure 23:
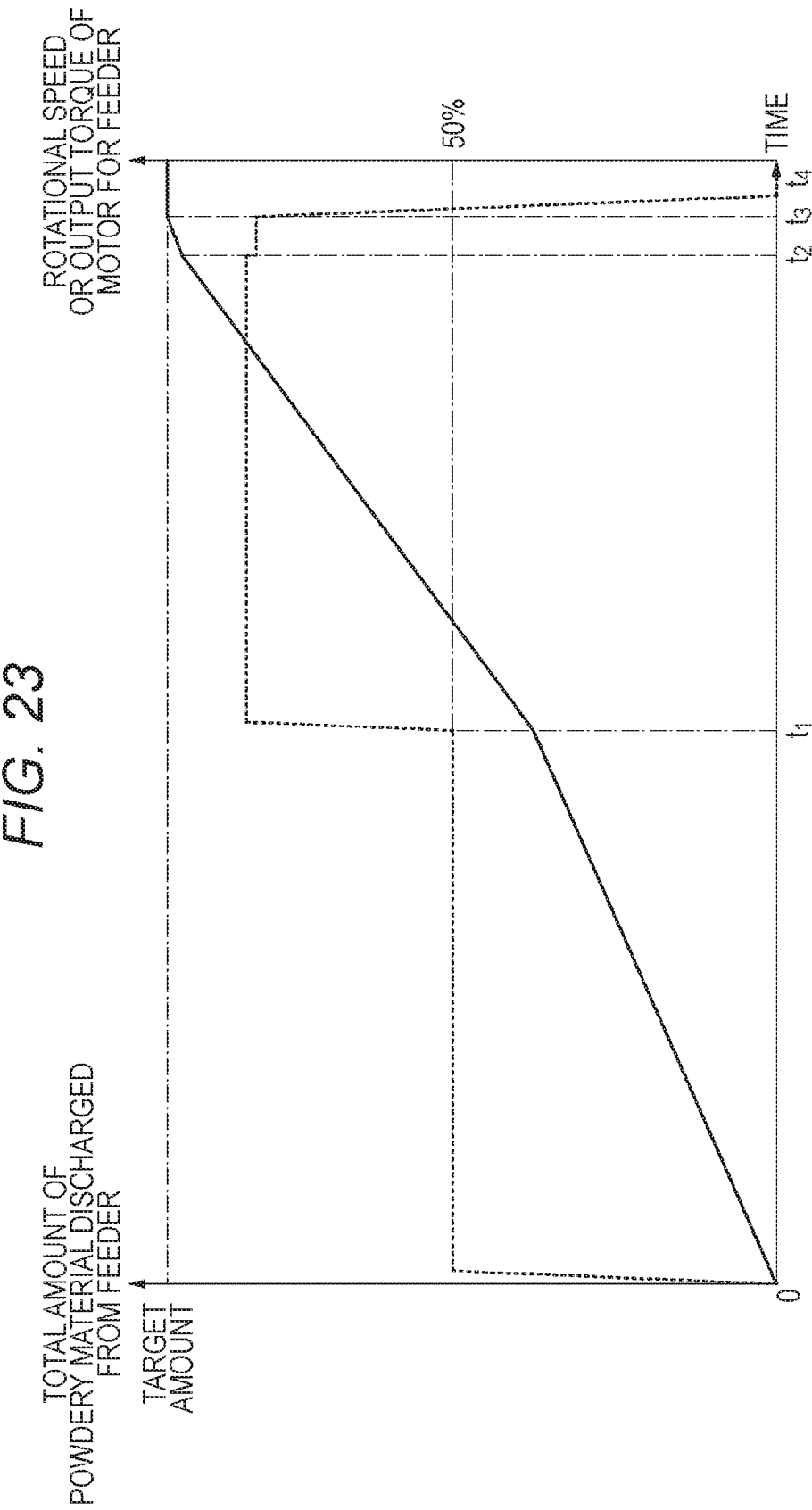
FIG. 23 is a timing chart indicating tuning of the feeder executed upon starting the rotary compression-molding machine according to the exemplary embodiment.

FIG. 23 exemplarily indicates transition of a total amount (i.e., an integrated value of the discharged amount, and a time integral of the discharge flow rate) of the powdery material discharged at one discharge opportunity (e.g., as a single batch of the powdery material) from one of the feeders Z1a, Z1b, and Z1c to be tuned, and the rotational speed or the output torque of the motor Z122 in the transfer mechanism Z12 of the corresponding feeder Z1a, Z1b, or Z1c. The graph indicates the amount of the powdery material discharged from the feeder Z1a, Z1b, or Z1c with a solid line, and the rotational speed or the output torque of the motor Z122 for the feeder Z1a, Z1b, or Z1c with a broken line.

The feeder Z1a, Z1b, or Z1c to be tuned discharges a target amount of the powdery material expected to be discharged at one discharge opportunity within a predetermined time $t_4$ (e.g., 120 seconds). The target amount is obtained by multiplying the single batch of the mixed-powdery materials supplied to the feeder X in the molding machine being stopped by a ratio according to the type of the powdery material discharged from the feeder Z1a, Z1b, or Z1c. In an exemplary case where the principal agent and the excipient or the like occupy 40% and 58%, respectively, of the mixed-powdery materials supplied to the feeder X in the molding machine and the single batch has 300 g, the feeder Z1a configured to discharge the powdery material of the principal agent has a target amount of 120 g to be discharged at one discharge opportunity, and the feeder Z1b, configured to discharge the powdery material of the excipient or the like, has a target amount of 174 g to be discharged at one discharge opportunity. A target amount preferred for accurate tuning is about or around 150 g.

The controller C in the system or the control unit Z15 in each of the feeders Z1a, Z1b, and Z1c divides into a plurality of periods, duration from powdery material discharge start time 0 at one discharge opportunity to the time $t_4$ after an elapse of the predetermined time, operates the motor Z122 to have a constant rotational speed or an output torque in each of the periods, and measures the amount of the powdery material discharged in each of the periods with use of the measuring instrument Z14. As exemplarily indicated in the graph, the duration is halved into a first half period from the time 0 to time $t_1$ (e.g., for 60 seconds from the powdery material start time 0) and a second half period from the time $t_1$ to the time $t_4$, and controls the rotational speed or the output torque of the motor Z122 to a first rotational speed such as 50% of a maximum value during the first half period. During the second half period, the rotational speed or the output torque of the motor Z122 is controlled to a second rotational speed different from the first rotational speed, particularly a rotational speed or an output torque higher than that in the first half period, such as about 80% of the maximum value. The maximum value or a control input value during the first half period (e.g., the first rotational speed, 50% of the maximum value herein) may be the rotational speed of the motor Z122 itself, may be based on an output rated value or the maximum value, or may have a value (e.g., a value set in accordance with an experimental value or an experience value obtained upon previous discharge of a similar type of a powdery material from the feeder Z1a, Z1b, or Z1c) preliminarily set in accordance with the type and the characteristics of the powdery material discharged from the target feeder Z1a, Z1b, or Z1c, shape, size, and other specifications of the transfer member Z121 in the target feeder Z1a, Z1b, or Z1c, or a reduction ratio or the like of a speed reducer interposed between the transfer member Z121 and the motor Z122.

The controller C or the control unit Z15 further measures a total amount and/or a discharge flow rate of the powdery material discharged from the target feeder Z1a, Z1b, or Z1c (i.e., a discharge amount per unit time, during the first half period). There is thus obtained a control output value of the target feeder Z1a, Z1b, or Z1c (i.e., the total amount and/or the flow rate of the powdery material discharged from the target feeder Z1a, Z1b, or Z1c), under the control input value commanded to the motor Z122 during the first half period, that is, the rotational speed or the output torque of 50% of the maximum value. The controller C or the control unit Z15 stores, in the memory, a set of the control input value and the control output value (e.g., the rotational speed or the output torque of the motor, the total discharge amount or the discharge flow rate during the period), and quotes the set for subsequent control of the motor Z122 in the transfer mechanism Z12.

The controller C or the control unit Z15 may adjust a compensator and a different parameter of a control system or a control loop for control of the target feeder Z1a, Z1b, or Z1c in accordance with a measurement result during the first half period, for application to subsequent control. The feeder Z1a, Z1b, or Z1c as a control target may be modelized (e.g., approximated in accordance with combination of wasted time and a first order lag element) in accordance with a step response, a pulse response, or a ramp response of the flow rate of the discharged powdery material as the control output value, for determination of proportional gain, integration gain, and/or derivative gain of a proportional-integral-derivative (PID) control system. The compensator and the different parameter are also stored in the memory of the controller C or the control unit Z15.

The controller C or the control unit Z15 further adjusts by increasing or decreasing the control input value commanded to the motor Z122 during the second half period, that is, the rotational speed or the output torque of the motor, in accordance with the measurement result during the first half period, and controls such that the target feeder Z1a, Z1b, or Z1c completes discharging the target amount of the powdery material at time $t_3$ several seconds before the predetermined time $t_4$. As the total amount or the flow rate of the discharged powdery material is smaller during the first half period, the rotational speed or the output torque commanded to the motor Z122 is higher during the second half period. As the total amount or the flow rate of the discharged powdery material is larger during the first half period, the rotational speed or the output torque commanded to the motor Z122 is lower during the second half period.

Discharge of the target amount of the powdery material is completed at the time $t_3$ several seconds before the time $t_4$ after elapse of the predetermined time and no powdery material is discharged from the time $t_3$ to the time $t_4$ in order not to increase the total amount of the discharged powdery material from the time $t_3$ to the time $t_4$, for reliable measurement of the amount of the discharged powdery material with use of the measuring instrument Z14 and further accuracy improvement of the measurement result. The rotational speed or the output torque of the motor Z122 is slightly adjusted (in particular, slightly decreased) from time $t_2$ several seconds before the time $t_3$ when the total amount of the discharged powdery material reaches the target amount.

The controller C or the control unit Z15 thus measures the total amount and/or the flow rate of the powdery material discharged from the target feeder Z1a, Z1b, or Z1c also during the second half period. There is thus obtained the total amount and/or the flow rate of the powdery material discharged from the target feeder Z1a, Z1b, or Z1c under the rotational speed or the output torque commanded to the motor Z122 during the second half period. The controller C or the control unit Z15 stores, in the memory, a set of the control input value and the control output value (i.e., the rotational speed or the output torque of the motor, the total discharge amount or the discharge flow rate during the period), and quotes the set for subsequent control of the motor Z122 in the transfer mechanism Z12.

The controller C or the control unit Z15 may adjust the compensator and the different parameter of the control system or the control loop for control of the target feeder Z1a, Z1b, or Z1c in accordance with a measurement result during the second half period, for application to subsequent control.

The controller C or the control unit Z15 may alternatively execute straight line fitting or curved line fitting by regression analysis, interpolation, or the like, to a plurality of sets of the control input values and the control output values obtained by measurement in a plurality of periods and/or for a plurality of times, to obtain a relational expression (i.e., a calibration curve) between the control input, that is, the rotational speed or the output torque of the motor Z122, and the control output, that is, the total amount or the flow rate of the powdery material discharged from the target feeder Z1a, Z1b, or Z1c. In this case, subsequent control enables calculation of the rotational speed or the output torque of the motor necessary for achievement of a desired total discharge amount or a discharge flow rate in accordance with the relational expression.

The duration from the powdery material discharge start time 0 to the time $t_4$ after elapse of the predetermined time upon tuning may be divided into three or more periods, instead of two periods. The rotational speed or the output torque of the motor Z122 during each of the periods may have a specific value not limited to the above exemplification. For example, the rotational speed or the output torque of the motor Z122 may be controlled to 30% of the maximum value during the first half period, and the rotational speed or the output torque of the motor Z122 may be controlled to approximately 70% of the maximum value during the second half period. Alternatively, the rotational speed or the output torque of the motor Z122 may be controlled to 70% of the maximum value during the first half period, and the rotational speed or the output torque of the motor Z122 may be controlled to approximately 30% of the maximum value during the second half period, such that the rotational speed or the output torque of the motor during the second half period is lower than that during the first half period.

The plurality of feeders Z1a, Z1b, and Z1c included in the powdery-material feeding device Z may be tuned individually or parallelly at one time. When the feeders Z1a and Z1b are tuned parallelly, the powdery material of the principal agent discharged from the feeder Z1a and the powdery material of the excipient or the like, discharged from the feeder Z1b, are simultaneously supplied to the reservoir Z30 in the vertical mixer Z3a that can thus appropriately mix the powdery materials without segregation. In this case, time (e.g., the predetermined time $t_4$) necessary for the feeder Z1a to discharge the target amount of the powdery material is preferred to be equal or substantially equal to time necessary for the feeder Z1b to discharge a target amount (often unequal to the target amount of the feeder Z1a) of the powdery material.

Although the discharge flow rate may vary during tuning, the powdery materials are accumulated from the bottom to the top of the reservoir Z30 in the vertical mixer Z3a at substantially constant ratios. In this case, the different types of powdery materials will not be layered in the reservoir Z30 unlike the case where the feeders Z1a and Z1b are tuned sequentially and individually, to achieve a better mixing degree of the powdery materials to be supplied to the feed pipe 191 and the feeder X.

When the powdery-material feeding device Z supplies in batches, the powdery materials to the feed pipe 191 and the feeder X in the molding machine being stopped before the molding machine starts, the feeders Z1a, Z1b, and Z1c can be tuned each time. That is, the feeders Z1a, Z1b, and Z1c can be tuned a plurality of times before the molding machine starts. This stabilizes input and output characteristics of the feeders Z1a, Z1b, and Z1c and improves control accuracy of the amounts of the powdery materials discharged from the feeders Z1a, Z1b, and Z1c.

The number of times of supplying the powdery materials from the powdery-material feeding device Z to the feed pipe 191 and the feeder X before the molding machine starts is not necessarily equal to the number of times of tuning the feeders Z1a, Z1b, and Z1c before the molding machine starts. In a case where the batch of the powdery materials are supplied from the powdery-material feeding device Z to the feed pipe 191 and the feeder X for five times before the molding machine starts, each of the feeders Z1a, Z1b, and Z1c intermittently discharges the batch of the powdery material five times. In this case, tuning including measurement of the discharge amount may be executed only during the last three times and may not executed during the first two times, in which case the number of times of tuning is less than the number of times of discharging and delivering the powdery materials for supply.

The second and subsequent tuning may be executed similarly to the first tuning. Alternatively, in accordance with a relation between the rotational speed or the output torque of the motor and the total amount or the flow rate of the discharged powdery material obtained by measurement so far, the rotational speed or the output torque of the motor for the target amount of the powdery material estimated to be discharged during the predetermined time $t_4$ may be provided to the motor Z122 as an initial value of the control input, the control input may be corrected halfway if necessary, and a relation between the rotational speed or the output torque of the motor after correction and the total amount or the flow rate of the discharged powdery material may also be measured and stored in the memory of the controller C or the control unit Z15.

When tuning is executed a plurality of times before the molding machine starts, the rotational speed or the output torque provided to the motor Z122, as the control input, can be changed each time.

The powdery materials discharged from the feeders Z1a, Z1b, and Z1c upon tuning of the feeders Z1a, Z1b, and Z1c in the molding machine being stopped are supplied as the batch to the feeder X and the feed pipe 191 disposed immediately thereabove in the molding machine. When the powdery materials are accumulated to the required level in the feed pipe 191 and the molding machine subsequently starts, the powdery materials discharged from the feeders Z1a, Z1b, and Z1c upon tuning are used to tablet a molded product during trial (for determination of compression molding conditions) of the molding machine. This configuration does not waste the powdery materials discharged from the feeders Z1a, Z1b, and Z1c upon tuning. Among the molded products produced by the molding machine, only defective or imperfect molded products are excluded and discarded.

While the molding machine is in operation after starting, the amount of the powdery material discharged from each of the feeders Z1a, Z1b, and Z1c may be controlled in accordance with an average value, a median value, or the like of measurement results obtained by a plurality of times of tuning. In view of chronological state change (e.g., the accumulated powdery material is pressed to increase bulk density) of the powdery material in the supply mechanism Z13 and/or the hopper Z11, only the result of the last or latest tuning may be referred to for control.

The exemplary embodiment provides a compression-molding processing system including a compression-molding machine including a table 31 having a vertically-penetrating die bore 4, a filling device X facing the die bore 4 of the table 31 and configured to be displaced relatively to the table 31 and fill, with a powdery material, the die bore 4 passing immediately below the filling device, and an upper punch 5 and a lower punch 6 configured to compress the powdery material filled in the die bore 4 to obtain a molded product, and a powdery-material feeding device Z configured to feed, with a powdery material, the filling device X in the molding machine in operation, in which, upon start of the molding machine having stopped relative displacement of the filling device X to the table 31, filling the powdery material to the die bore 4, and compression molding the powdery material filled in the die bore 4 by the upper punch 5 and the lower punch 6, a feeder Z1a, Z1b, or Z1c included in the powdery-material feeding device Z preliminarily supplies the filling device X with a predetermined amount of a powdery material while stopping relative displacement of the filling device X and compression by the upper punch 5 and the lower punch 6, and the molding machine is subsequently started to fill the powdery material by the filling device X and compression mold the powdery material by the upper punch 5 and the lower punch 6. The system according to the exemplary embodiment achieves production of a molded product having required quality from a period immediately after the molding machine starts.

The exemplary embodiment further includes tuning of measuring a relation between the control input provided to a motor Z122 of the feeder Z1a, Z1b, or Z1c and a flow rate of the powdery material discharged from the feeder Z1a, Z1b, or Z1c when the feeder Z1a, Z1b, or Z1c in the powdery-material feeding device Z supplies the predetermined amount of the powdery material to the filling device X before the start of the molding machine being stopped. The feeder Z1a, Z1b, or Z1c can be tuned without being detached from the powdery-material feeding device Z, which leads to a decrease in labor and work necessary for tuning. The powdery material discharged from the feeder Z1a, Z1b, or Z1c upon tuning is used for tableting by the molding machine during trial.

Optionally, upon the start of the molding machine being stopped, the feeder Z1a, Z1b, or Z1c in the powdery-material feeding device Z supplies the filling device X with the predetermined amount of the powdery material in batches and the molding machine is subsequently started. The powdery material supplied to the filling device X before the molding machine starts is agitated or mixed sufficiently, and defectiveness of the molded product can be more reliably avoided during the period immediately after the molding machine starts. It is also possible to increase the number of times of tuning the feeder Z1a, Z1b, or Z1c before the molding machine starts.

The powdery-material feeding device Z is configured to continuously or intermittently feed the filling device X with mixed-powdery materials including a plurality of types of powdery materials while the molding machine is in operation without stopping a relative displacement of the filling device X, filling with the powdery materials, and compression molding of the powdery materials by the upper punch 5 and the lower punch 6, and upon the start of the molding machine being stopped, the feeders Z1a, Z1b, and Z1c in the powdery-material feeding device Z supply the filling device X with a predetermined amount of the mixed-powdery materials including the plurality of types of powdery materials, and the molding machine is subsequently started. A molded product made of a constituent material as a mixture of the plurality of types of powdery materials and having required quality can be produced from the period immediately after the molding machine starts.

When the filling device X is supplied with the predetermined amount of the powdery materials obtained by mixing the powdery materials discharged from the plurality of feeders Z1a, Z1b, and Z1c at predetermined ratios before the start of the molding machine being stopped, each of the feeders Z1a, Z1b, and Z1c can be individually tuned through measurement of the relation between the control input provided to the motor Z122 in the feeder Z1a, Z1b, or Z1c and the flow rate of the powdery material discharged from the feeders Z1a, Z1b, or Z1c.

According to the exemplary embodiment, when the feeder Z1a, Z1b, or Z1c in the powdery-material feeding device Z supplies the filling device X with the predetermined amount of the powdery material before the start of the molding machine being stopped, the processing system executes tuning of measuring the amount of the powdery material discharged from the feeder Z1a, Z1b, or Z1c during provision of input for control of the motor Z122 of the feeder Z1a, Z1b, or Z1c to a first rotational speed, and measuring an amount of the powdery material discharged from the feeder Z1a, Z1b, or Z1c during provision of input for control of the motor Z122 of the feeder Z1a, Z1b, or Z1c to a second rotational speed different from the first rotational speed. This configuration achieves further improvement in tuning accuracy and control of the amount of the powdery material discharged from the feeder Z1a, Z1b, or Z1c.

The powdery-material feeding device Z includes a measuring feeder Z1a configured to store and discharge a powdery material serving as a principal agent, and a separate measuring feeder Z1b or Z1c configured to store and discharge an additive, other than the principal agent, added to the principal agent, and is configured to mix the principal agent and the additive at predetermined ratios to feed the filling device X.

Upon the start of the molding machine being stopped, the powdery-material feeding device Z supplies the filling device X with a predetermined amount of powdery materials including the principal agent and the additive mixed at the predetermined ratios, and the molding machine is subsequently started. This system achieves efficient production of a molded product such as a pharmaceutical tablet having appropriate content ratios of the principal agent and the additive. The measuring feeder Z1a configured to discharge the principal agent and the measuring feeder Z1b configured to discharge the excipient are disposed side by side laterally. The measuring feeders Z1a and Z1b discharge the principal agent and the excipient at predetermined ratios, and these powdery materials join and drop vertically to be appropriately mixed by the mixer Z3a.

The exemplary invention is not limited to the embodiment detailed above. The powdery-material feeding device Z according to the exemplary embodiment has a connection target or the equipment configured to be supplied with the powdery materials discharged from the feeders Z1a, Z1b, and Z1c and execute a post process, and the equipment is configured as a rotary compression-molding machine. The equipment configured to execute the post process using the powdery materials is not limited to the compression-molding machine. For example, the powdery-material feeding device Z according to the exemplary invention can be connected to an equipment configured to produce a capsule filled with a powdery material by a filling device to achieve a processing system configured to feed the filling device of the equipment with the powdery materials discharged from the feeders Z1a, Z1b, and Z1c in the powdery-material feeding device Z. In this case, obviously, the feeder Z1a, Z1b, or Z1c is tuned before start of the equipment being stopped, and the powdery material discharged from the feeder Z1a, Z1b, or Z1c is supplied to the filling device of the equipment being stopped.

The specific configuration of each portion can be modified within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A processing system, comprising:
a powdery-material feeding device including at least one of a plurality of feeders configured to discharge a reserved powdery material, and a sensor or a level switch; and
an equipment including a filling device configured to be fed with the powdery-material discharged from the feeder in the powdery-material feeding device and configured to execute a post process using the powdery material filled by the filling device; and
a controller for controlling the powdery-material feeding device and the equipment;
wherein, the controller is configured to determine a level of reserved powdery material in at least one of the plurality of feeders based on the sensor/level switch, and whether to start the equipment in a stopped state and to execute the post process;
wherein, the controller is configured to control a start of the equipment having stopped filling with the powdery material by the filling device and executing the post process, and to supply the filling device with a predetermined amount of the powdery material from at least one of the plurality of feeders while the equipment is stopped, and the equipment is subsequently started to fill with the powdery material by the filling device and to execute the post process, and
wherein, the controller is configured to provide instructions, when at least one of the plurality of feeders in the powdery-material feeding device supplies the filling device with the predetermined amount of the powdery material before the start of the equipment being stopped, to execute automatically tuning the at least one of the plurality of feeders by measuring a first amount of the powdery material discharged from the at least one of the plurality of feeders during provision of input for controlling a motor of the at least one of the plurality feeders to a first rotational speed, and measuring a second amount of the powdery material discharged from the at least one of the plurality of feeders during provision of input for control of the motor of the at least one of the plurality of feeders to a second rotational speed different from the first rotational speed, then to control a transfer mechanism to cause the flow rate of the discharged powdery material to have a required target value.

2. The processing system according to claim 1, wherein the at least one of the plurality of feeders in the powdery-material feeding device is controlled by the controller to supply the filling device with the predetermined amount of the powdery material in batches before the start of the equipment being stopped.

3. The processing system according to claim 1, the wherein the powdery-material feeding device comprises the plurality of feeders, and mixes powdery materials discharged from the plurality of feeders at predetermined ratios and then feeding the powdery materials to the filling device before the start of the equipment being stopped.

4. The processing system according to claim 1, wherein the equipment includes a compression-molding machine including a table including a vertically-penetrating die bore, the filling device facing the die bore of the table and configured to be displaced relatively to the table and to fill, with a powdery material, the die bore passing immediately below the filling device, and an upper punch and a lower punch configured to compress the powdery material filled in the die bore to obtain a molded product, and
wherein the powdery-material feeding device is configured to feed, with a powdery material, the filling device in the compression-molding machine before being started and in operation after being started.

5. The processing system according to claim 4, wherein the powdery-material feeding device includes at least one of the plurality of feeders configured to store and to discharge a powdery material of a principal agent, and a separate feeder configured to store and to discharge a powdery material of an additive to the principal agent, and is configured to mix the principal agent and the additive at predetermined ratios to feed the filling device in the compression-molding machine, and
wherein, before a start of the compression-molding machine being stopped, the filling device is supplied with a predetermined amount of powdery materials including the principal agent and the additive discharged from the plurality of feeders in the powdery-material feeding device and mixed at the predetermined ratios.

6. The processing system according to claim 2, wherein the powdery-material feeding device comprises the plurality of the feeders, and mixes powdery materials discharged from the plurality of feeders at predetermined ratios and then feeds the powdery materials to the filling device of the equipment
before the start of the equipment being stopped.

7. The processing system according to claim 2, wherein the equipment includes a compression-molding machine including a table rotatable by the turret including a vertically-penetrating die bore, the filling device facing the die bore of the table and configured to be displaced relatively to the table and to fill, with a powdery material, the die bore passing immediately below the filling device, and an upper punch and a lower punch configured to compress the powdery material filled in the die bore to obtain a molded product, and wherein the powdery-material feeding device is configured to feed, with a powdery material, the filling device in the compression-molding machine before being started and in operation after being started.

8. The processing system according to claim 7, wherein the powdery-material feeding device includes the plurality of feeders configured to store and to discharge a powdery material of a principal agent, and a separate feeder configured to store and to discharge a powdery material of an additive to the principal agent, and is configured to mix the principal agent and the additive at predetermined ratios to feed the filling device in the compression-molding machine, and wherein, before a start of the compression-molding machine being stopped, the filling device is supplied with a predetermined amount of powdery materials including the principal agent and the additive discharged from the plurality of feeders in the powdery-material feeding device and mixed at the predetermined ratios.

9. The processing system according to claim 3, wherein the equipment includes a compression-molding machine including a table including a vertically-penetrating die bore, the filling device facing the die bore of the table and configured to be displaced relatively to the table and to fill, with a powdery material, the die bore passing immediately below the filling device, and an upper punch and a lower punch configured to compress the powdery material filled in the die bore to obtain a molded product, and wherein the powdery-material feeding device is configured to feed, with a powdery material, the filling device in the compression-molding machine before being started and in operation after being started.

10. The processing system according to claim 9, wherein the powdery-material feeding device includes at least one of the plurality of feeders configured to store and to discharge a powdery material of a principal agent, and a separate feeder configured to store and to discharge a powdery material of an additive to the principal agent, and is configured to mix the principal agent and the additive at predetermined ratios to feed the filling device in the compression-molding machine, and wherein, before a start of the compression-molding machine being stopped, the filling device is supplied with a predetermined amount of powdery materials including the principal agent and the additive discharged from the plurality of feeders in the powdery-material feeding device and mixed at the predetermined ratios.

11. A method of controlling a processing system, comprising the steps of:

providing a powdery-material feeding device including at least one of a plurality of feeders configured to discharge a reserved powdery material, a sensor or a level switch; and providing an equipment including a filling device configured to be fed with the powdery material discharged from the at least one of a plurality of feeders in the powdery-material feeding device and configured to execute a post process using the powdery material filled by the filling device, providing a controller for controlling the powdery-material feeding device and the equipment; wherein, the controller determining a level of reserved powdery material in the feeder based on the sensor/level switch, and whether to start the equipment and to execute the post process;

controlling a start of the equipment having stopped filling with the powdery material by the filling device and executing the post process, at least one of the plurality of the feeders in the powdery-material feeding device preliminarily supplies the filling device with a predetermined amount of the powdery material while the equipment is stopped based on the level sensor; and the equipment is subsequently started to fill with the powdery material by the filling device and to execute the post process, and tuning at least one of the plurality of feeders, when at least one of the plurality of the feeders in the powdery-material feeding device supplies the filling device with the predetermined amount of the powdery material before the start of the equipment being stopped, the controller providing instructions to execute automatically tuning the feeder by measuring a first amount of the powdery material discharged from at least one of the plurality of feeders during provision of input for controlling a motor of at least one of the plurality feeders to a first rotational speed, and measuring a second amount of the powdery material discharged from at least one of the plurality of feeders during provision of input for control of the motor of the feeder to a second rotational speed different from the first rotational speed, then to control a transfer mechanism to cause the flow rate of the discharged powdery material to have a required target value.

12. The method according to claim 11, wherein, before the start of the equipment is stopped, the feeder in the powdery-material feeding device, as controlled by the controller, supplies the filling device with the predetermined amount of the powdery material in batches.

13. The method according to claim 11, wherein, before the start of the equipment is stopped, the at least one of the plurality of feeders in the powdery-material feeding device supplies the filling device with a predetermined amount of the powdery material in batches, and the equipment is subsequently started.

14. The method according to claim 11, wherein the control input includes a rotational speed of the motor of the at least one of the plurality of feeders.

15. The method according to claim 11, wherein the control input includes an output torque of the motor of the at least one of the plurality of feeders.

16. The processing system according to claim 1, further comprising:

a memory storing instructions;

the controller executing the instructions, the controller configured to:

upon a start of the equipment having stopped filling with the powdery material by the filling device and executing the post process, control the feeder in the powdery-material feeding device to preliminarily supply the filling device with a predetermined amount of the powdery material while the equipment is stopped, and control the equipment to be subsequently started to fill with the powdery material by the filling device and to execute the post process, and when the feeder in the powdery-material feeding device supplies the filling device with the predetermined amount of the powdery material before the start of the equipment being stopped, to execute tuning the feeder by measuring the relation between the control input provided to the motor of the feeder and the flow rate of the powdery material discharged from the feeder.

17. The processing system according to claim 16, wherein the tuning the at least one of the plurality of feeders includes commanding, by the controller, a predetermined rotational speed or output torque of the motor to the motor in the at least one of the plurality of feeders stored in the memory and measuring the predetermined amount of powdery material discharged from the at least one of the plurality of feeders from information received from a measuring instrument, and wherein the controller controls the powdery material discharged from the at least one of the plurality of feeders upon tuning to feed to the equipment configured to execute post processes, such that an entirety of the powdery material is not discarded.

18. The processing system according to claim 1, wherein the tuning the feeder is relative to a rotational speed and/or an output torque of the motor and an amount of powdery material being discharged from the feeder, further comprising:
a memory storing instructions executable by the controller; and
a measuring instrument that measures the flow rate,
wherein the controller executes the tuning by measuring the relation between the control input provided to the motor of the feeder and the flow rate, received from the measuring instrument, of the powdery material discharged from the feeder,
wherein the tuning is performed without removal of the at least one feeder.

\* \* \* \* \*